United States Patent
Song et al.

(10) Patent No.: US 8,230,754 B2
(45) Date of Patent: Jul. 31, 2012

(54) SAFETY UNIT AND SAFETY DEVICE WITH THE SAME

(75) Inventors: Jae-Bok Song, Seoul (KR); Jung-Jun Park, Seoul (KR); Byeong-Sang Kim, Seoul (KR)

(73) Assignee: Korea University Industry and Academy Cooperation Foundation, Seoul (KR)

( * ) Notice: Subject to any disclaimer, the term of this patent is extended or adjusted under 35 U.S.C. 154(b) by 1220 days.

(21) Appl. No.: 11/997,222

(22) PCT Filed: Aug. 11, 2006

(86) PCT No.: PCT/KR2006/003144
§ 371 (c)(1), (2), (4) Date: Jan. 29, 2008

(87) PCT Pub. No.: WO2007/018412
PCT Pub. Date: Feb. 15, 2007

(65) Prior Publication Data
US 2008/0190224 A1 Aug. 14, 2008

(30) Foreign Application Priority Data

Aug. 11, 2005 (KR) .................. 10-2005-0073990
Aug. 10, 2006 (KR) .................. 10-2006-0075899

(51) Int. Cl.
*F16P 7/02* (2006.01)
(52) U.S. Cl. .......................................... 74/470
(58) Field of Classification Search ................ 74/40, 42, 74/470, 493, 492, 380, 384, 385, 479, 490.05, 74/89.18; 464/30, 38, 39; 901/21, 26, 28
See application file for complete search history.

(56) References Cited

U.S. PATENT DOCUMENTS

| | | | | |
|---|---|---|---|---|
| 3,261,223 A | * | 7/1966 | Vertut | 74/380 |
| 3,597,989 A | * | 8/1971 | Benson | 74/385 |
| 4,480,495 A | * | 11/1984 | Obama | 74/490.05 |
| 4,566,555 A | * | 1/1986 | Schlanger | 180/274 |
| 5,655,413 A | * | 8/1997 | Barton | 74/493 |
| 6,026,704 A | * | 2/2000 | Shibata et al. | 74/496 |
| 6,161,638 A | | 12/2000 | Barthalow | |
| 7,415,908 B2 | * | 8/2008 | Zernickel et al. | 74/493 |
| 7,735,385 B2 | * | 6/2010 | Wilson et al. | 74/89.18 |

FOREIGN PATENT DOCUMENTS

| | | |
|---|---|---|
| DE | 36 37 087 A1 | 5/1988 |
| FR | 2 554 699 | 11/1984 |
| JP | 4-141392 | 5/1992 |
| JP | 7-24776 | 1/1995 |
| JP | 7-75990 | 3/1995 |
| JP | 2004-195576 | 7/2004 |
| NL | 1003395 | 12/1997 |

* cited by examiner

*Primary Examiner* — Robert Pezzuto
(74) *Attorney, Agent, or Firm* — Rabin & Berdo, P.C.

(57) ABSTRACT

The present invention provides a safety unit comprising: a case; a rotary linkage disposed at one end thereof at the outside of the case and rotatably mounted at the other end thereof to the case; a force transfer shaft mounted to one side of the rotary linkage in such a fashion as to be oriented perpendicular to the rotating plane of the rotary linkage; a crank linkage rotatably mounted at one end thereof to the inner side of the case and adapted to abut against the force transfer shaft at the outer circumferential edge thereof so as to be transferred with an external force to be rotatably moved; and a support means rotatably connected to the other end of the crank linkage and adapted to allow for the rotation of the crank linkage when an external force having a value larger than a predetermined threshold value is exerted to the rotary linkage.

9 Claims, 28 Drawing Sheets

[Figure 1]
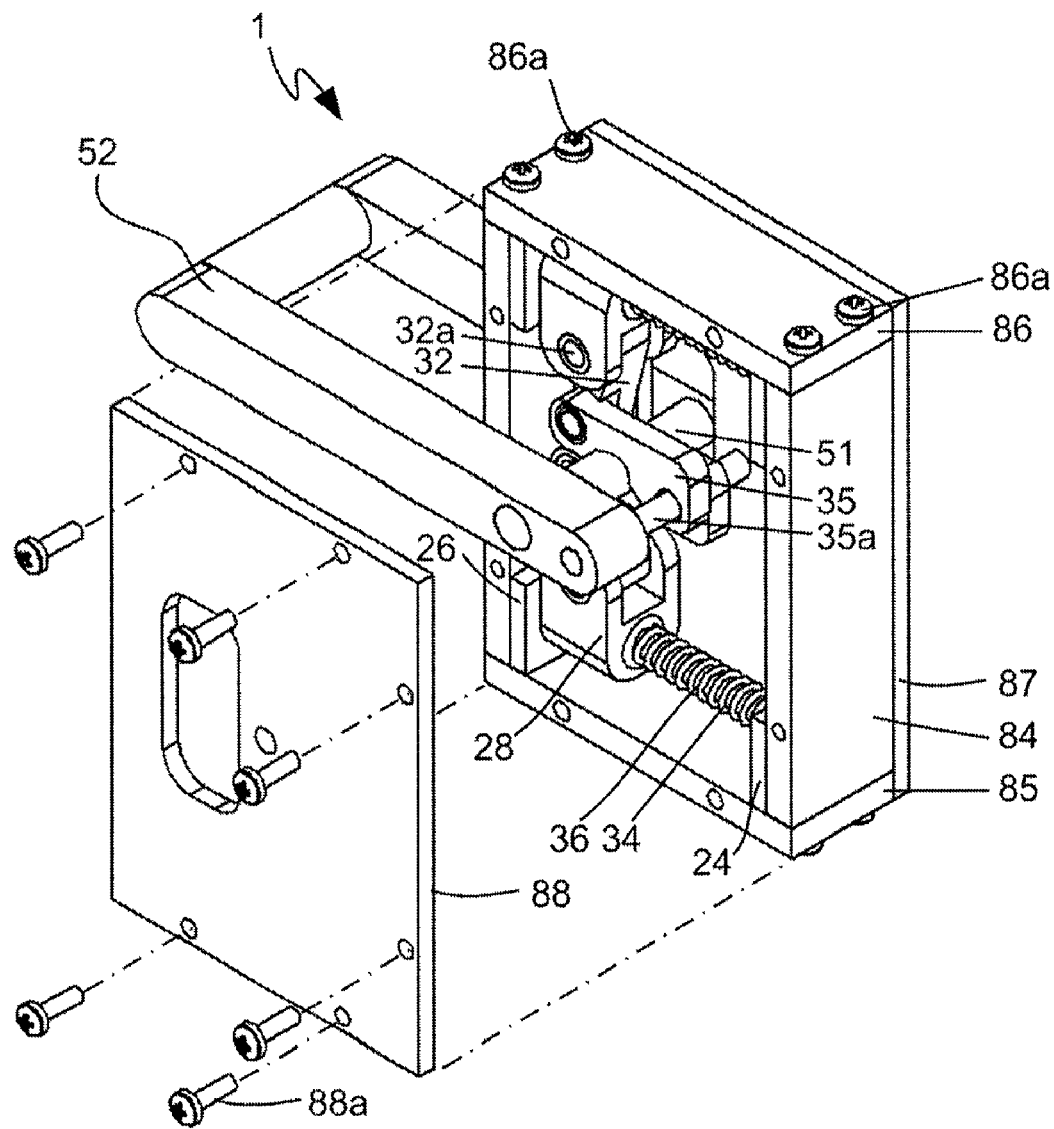

[Figure 2]
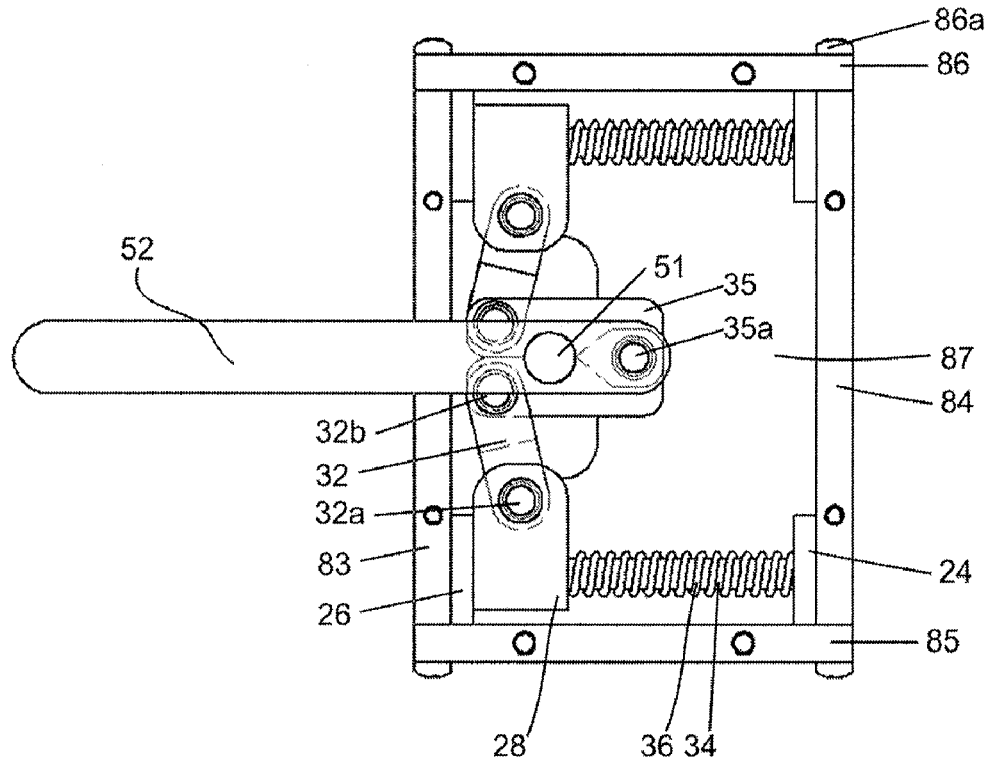
[Figure 3]
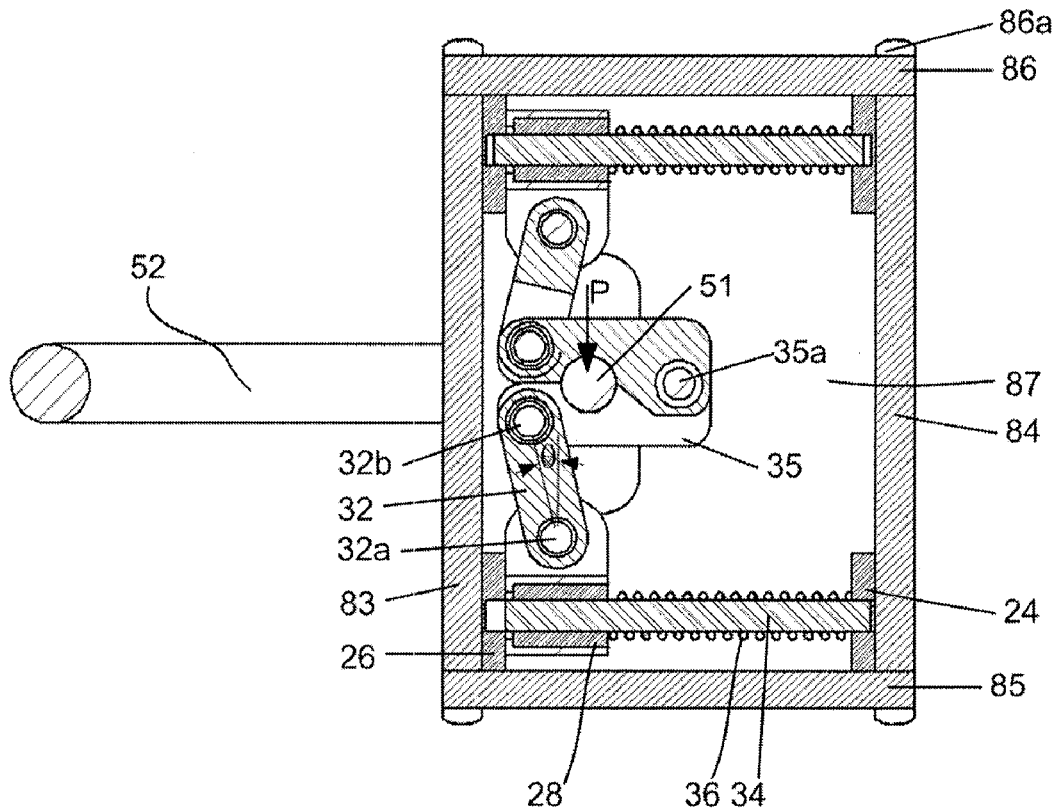

[Figure 4]
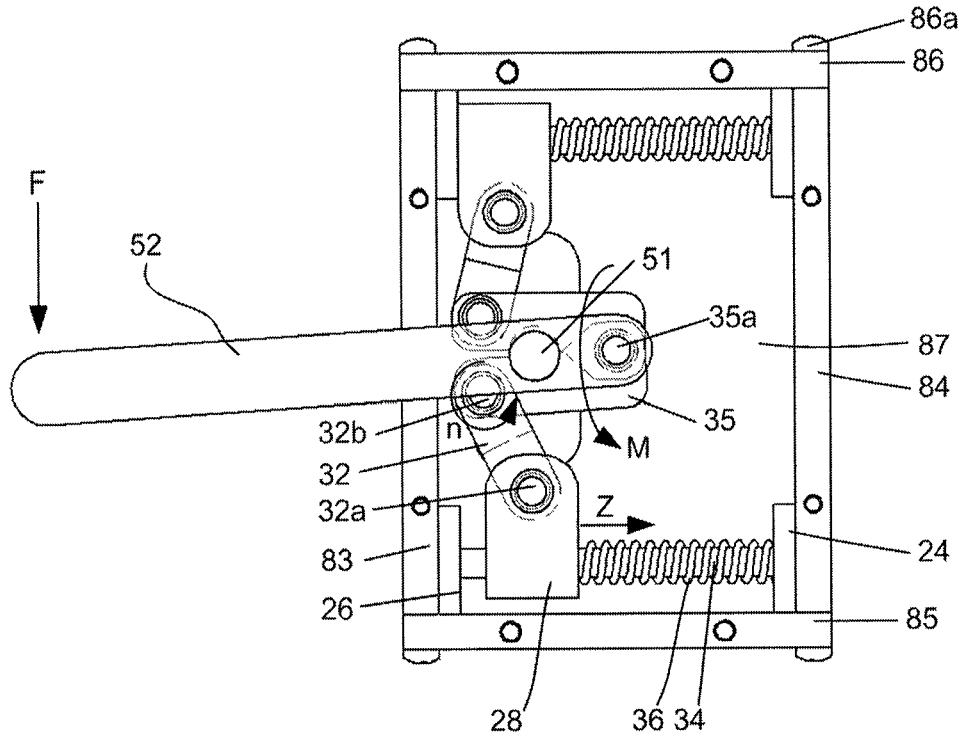
[Figure 5]
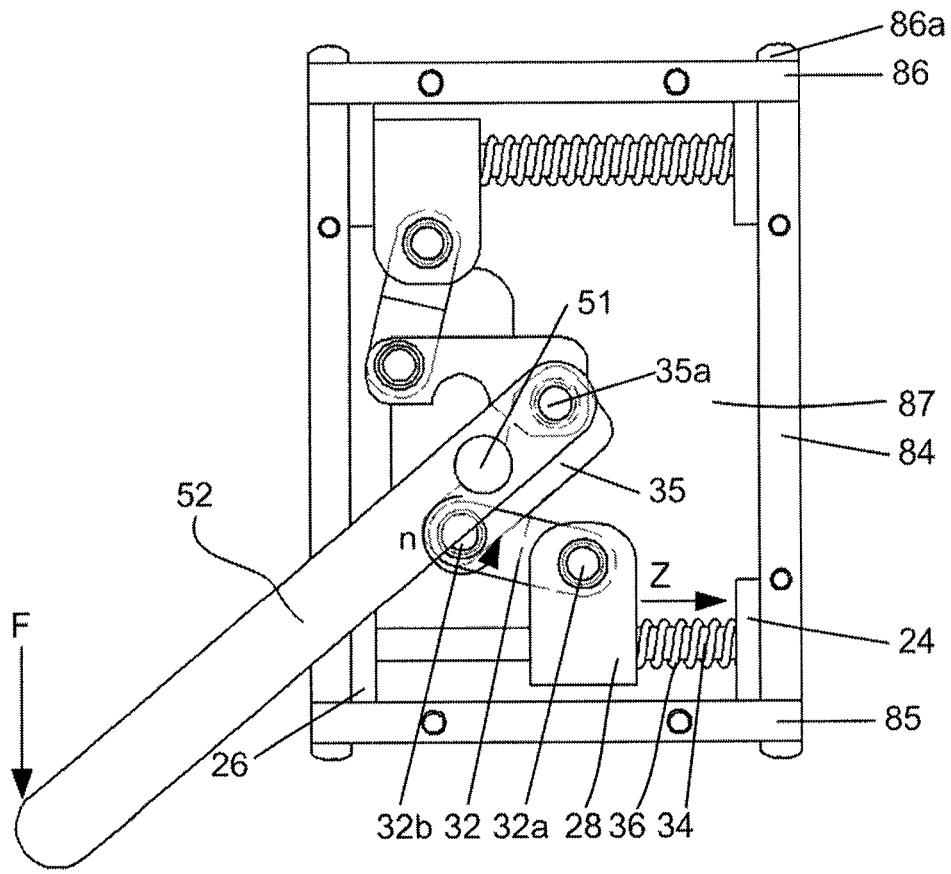

[Figure 6]
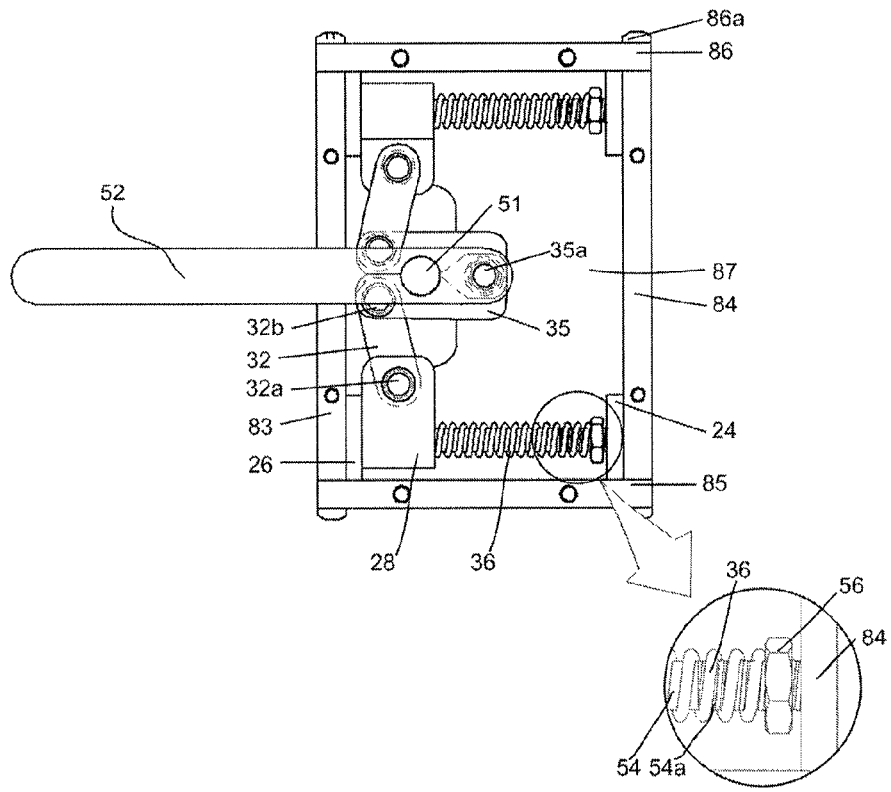
[Figure 7]
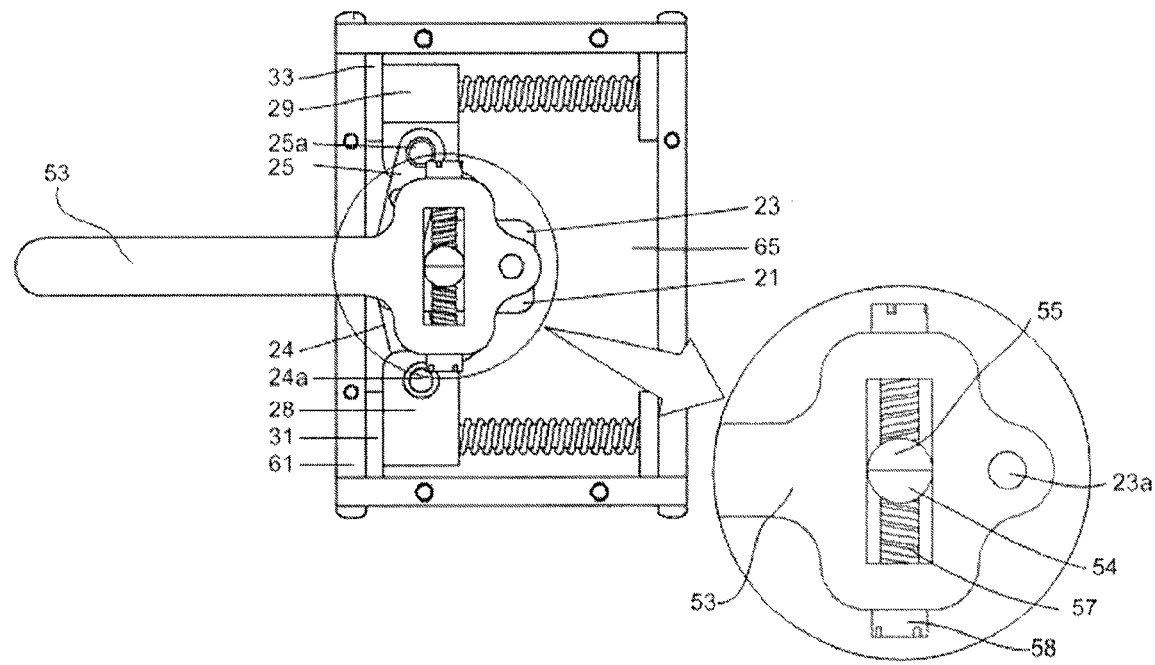

【Figure 8】
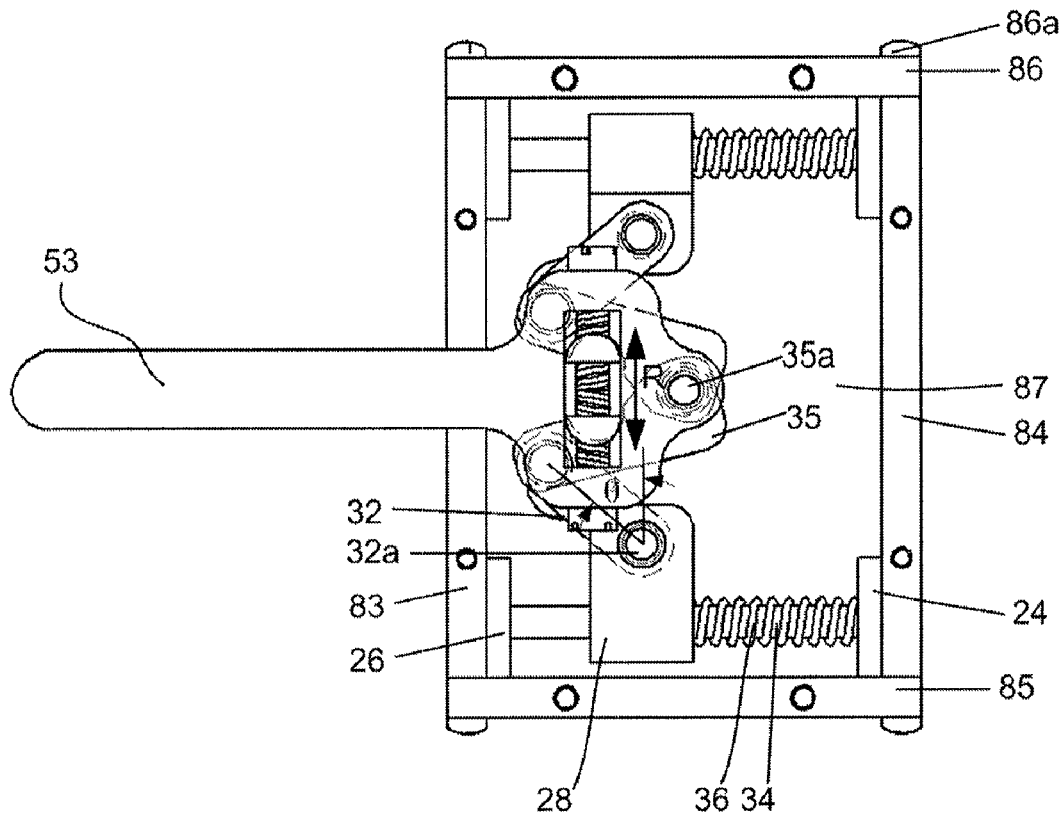
【Figure 9】
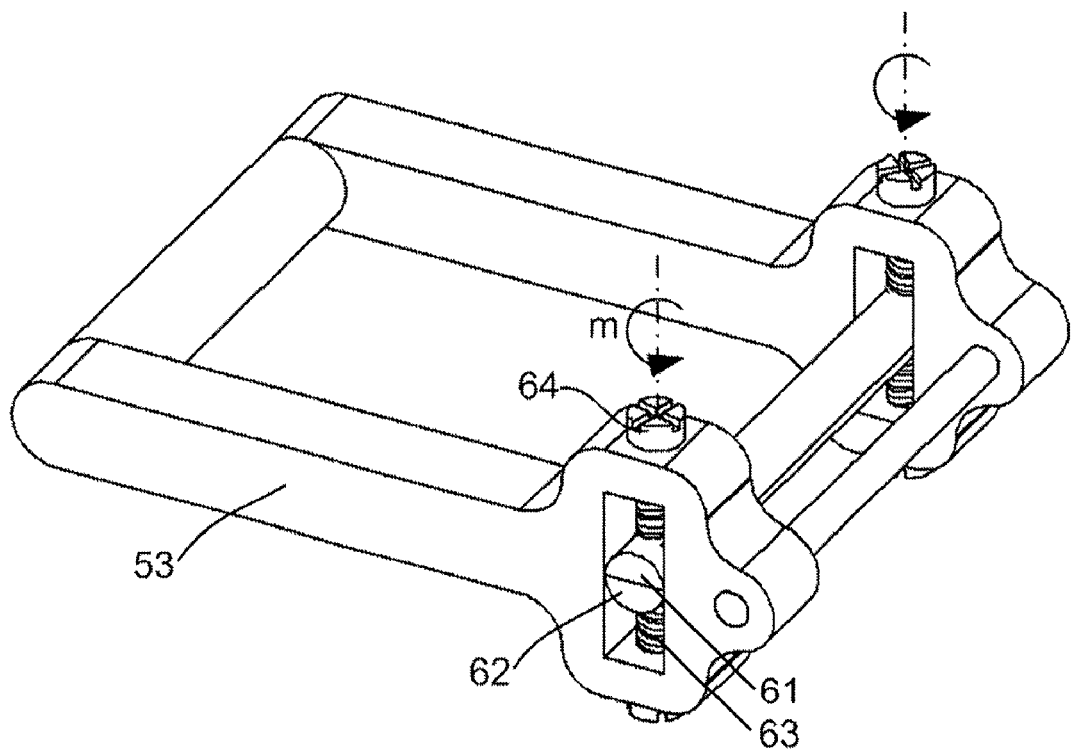

[Figure 10]
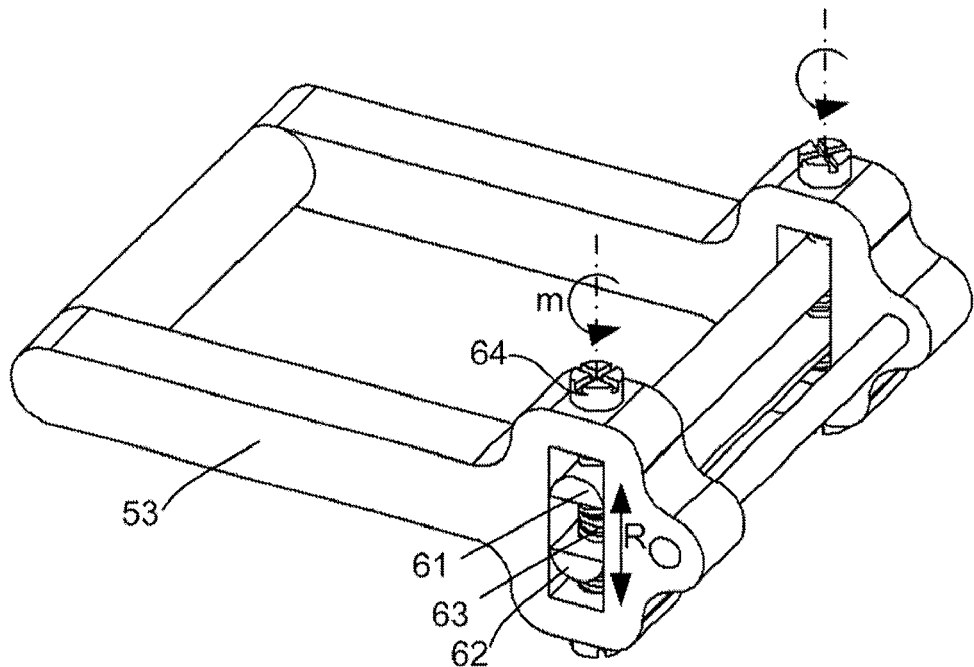
[Figure 11]
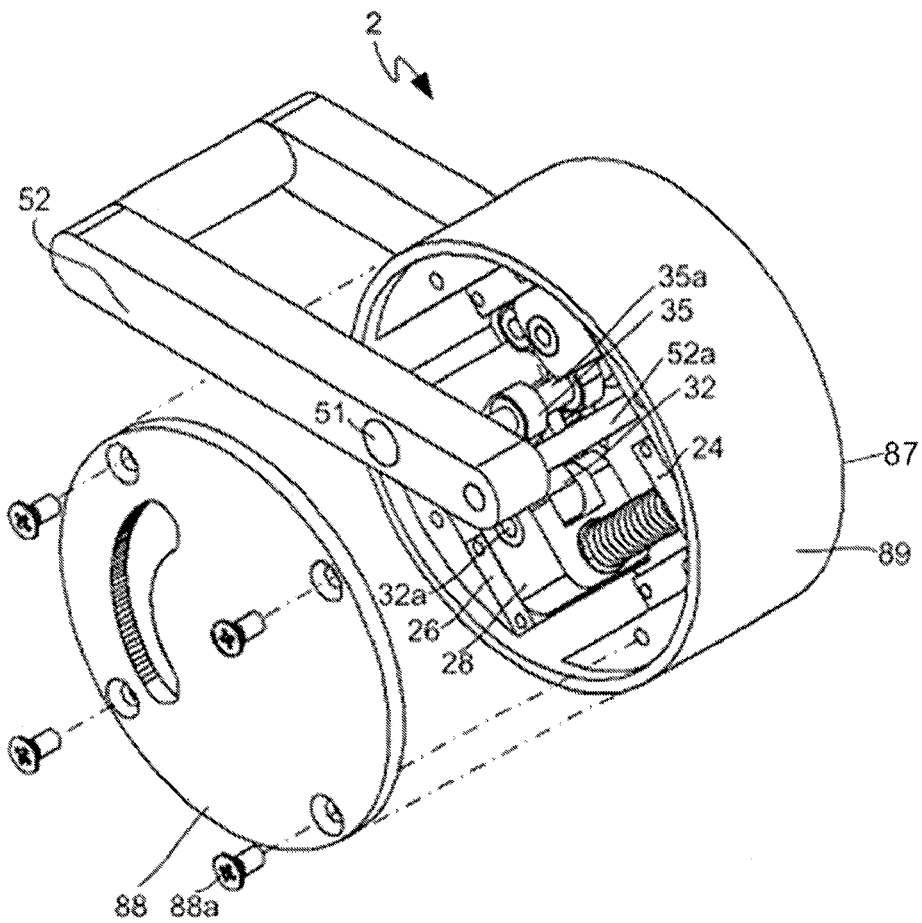

[Figure 12]
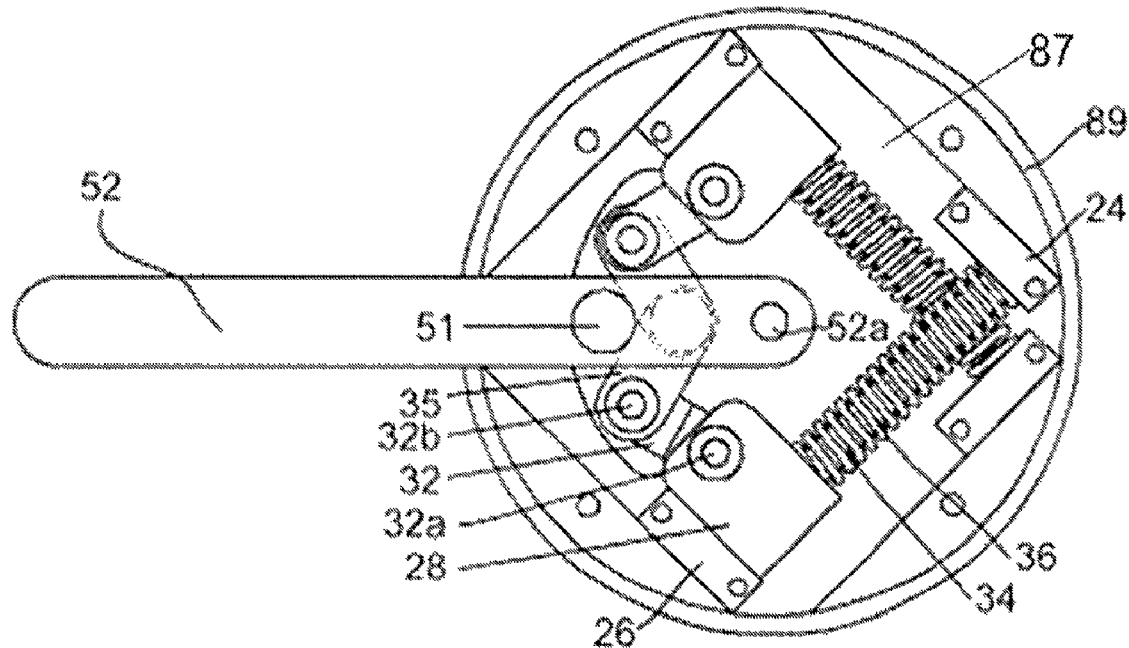
[Figure 13]
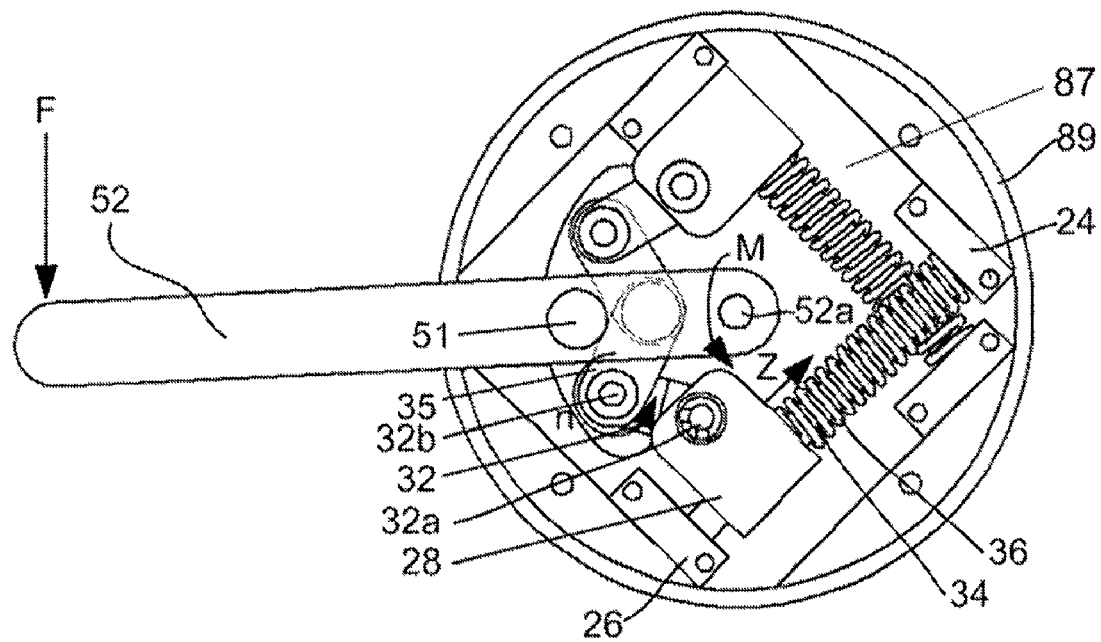

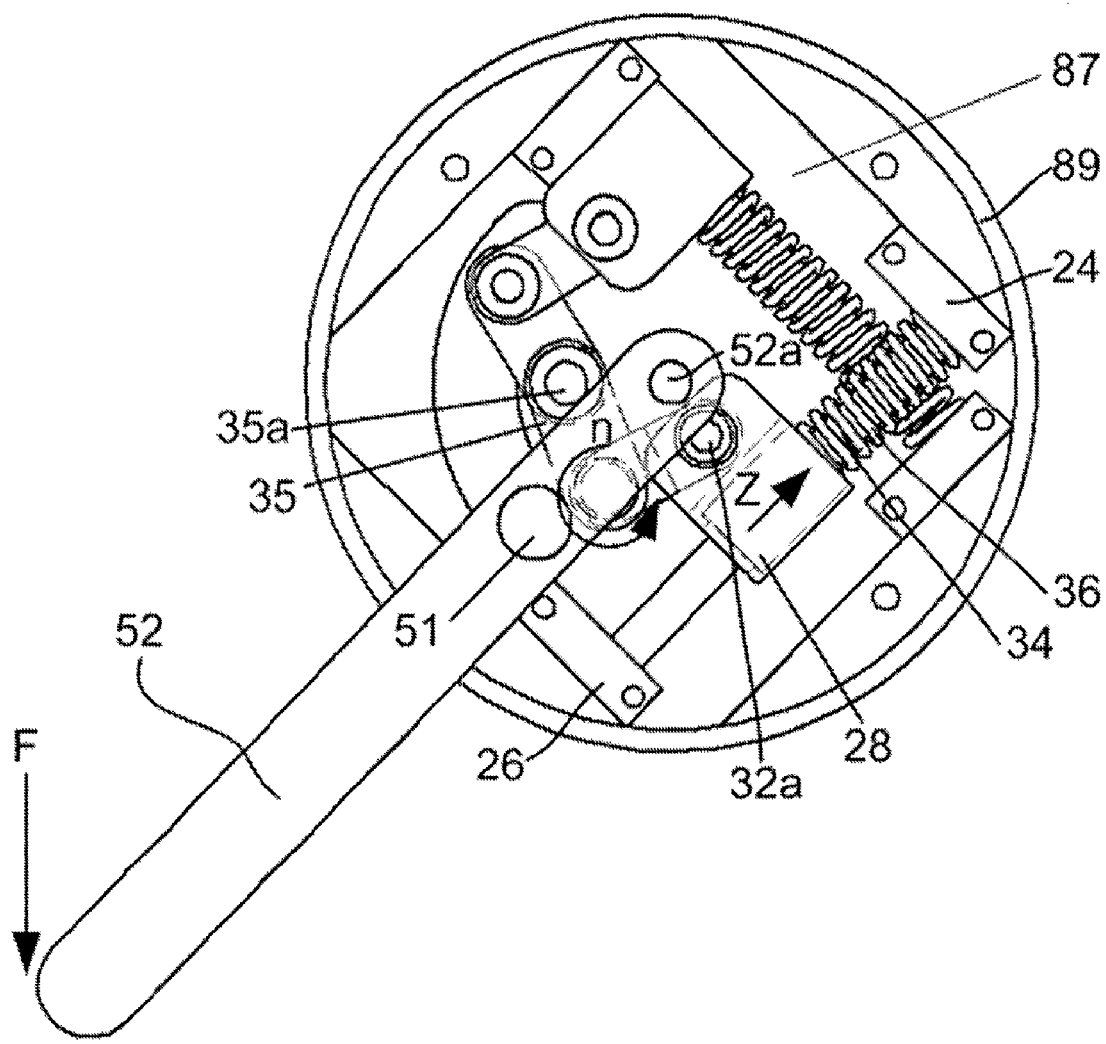
[Figure 14]

[Figure 15]
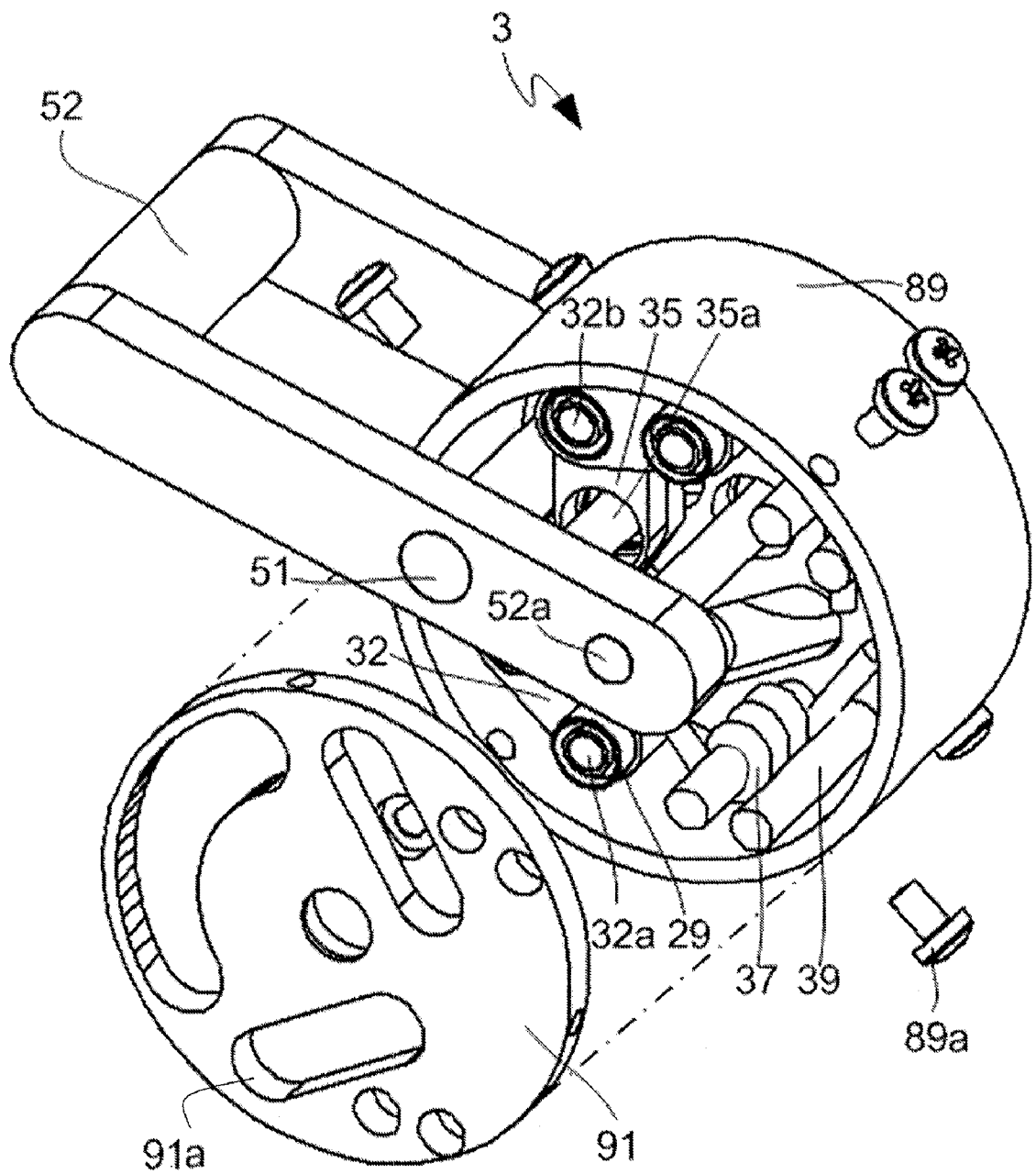

【Figure 16】
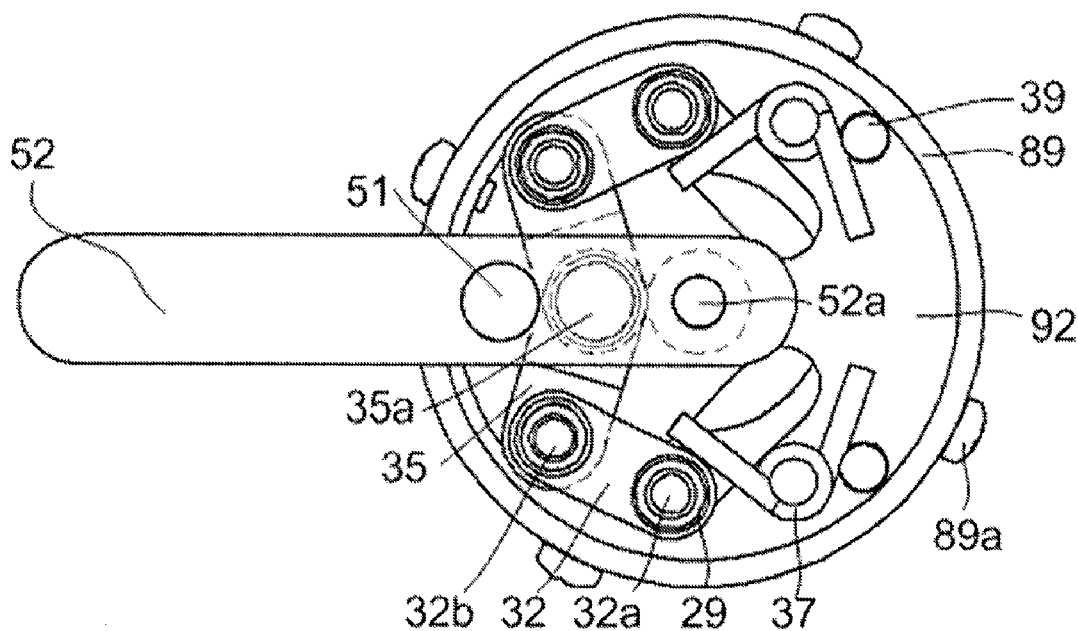
【Figure 17】
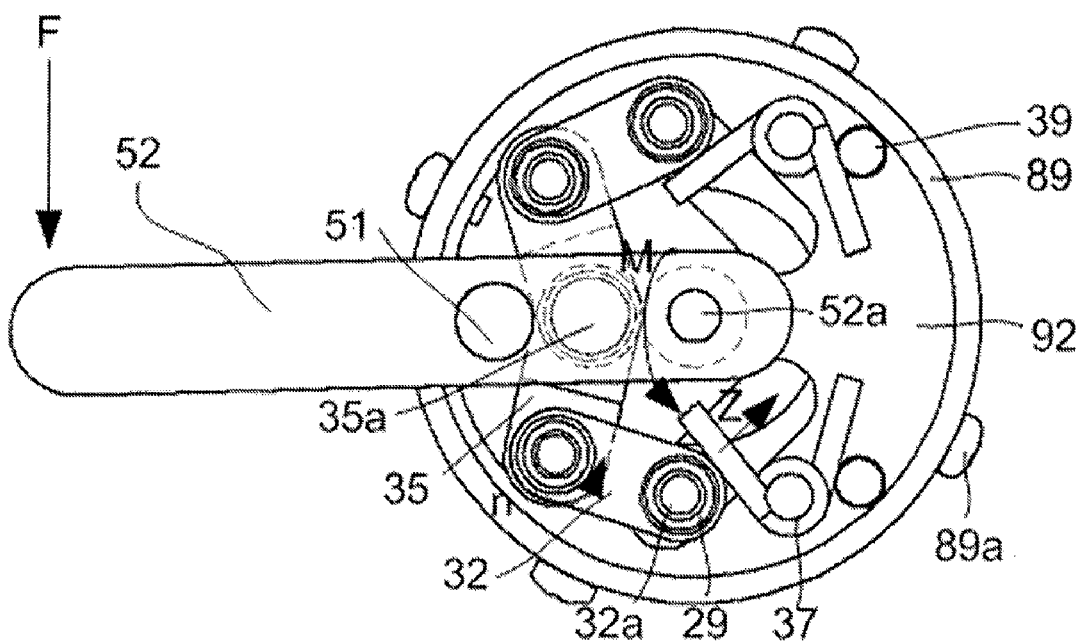

【Figure 18】
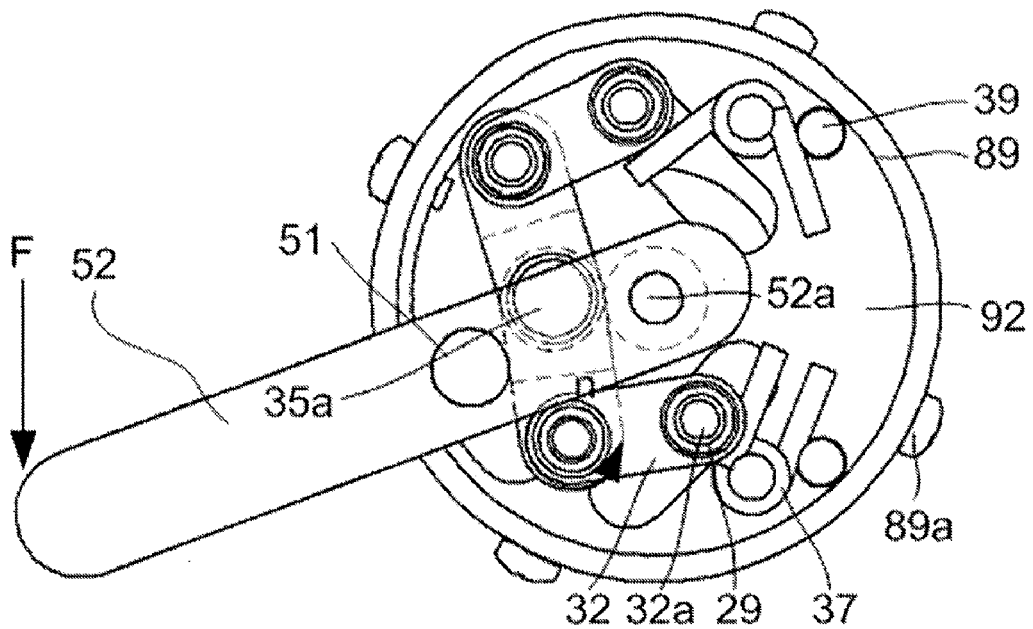
【Figure 19】
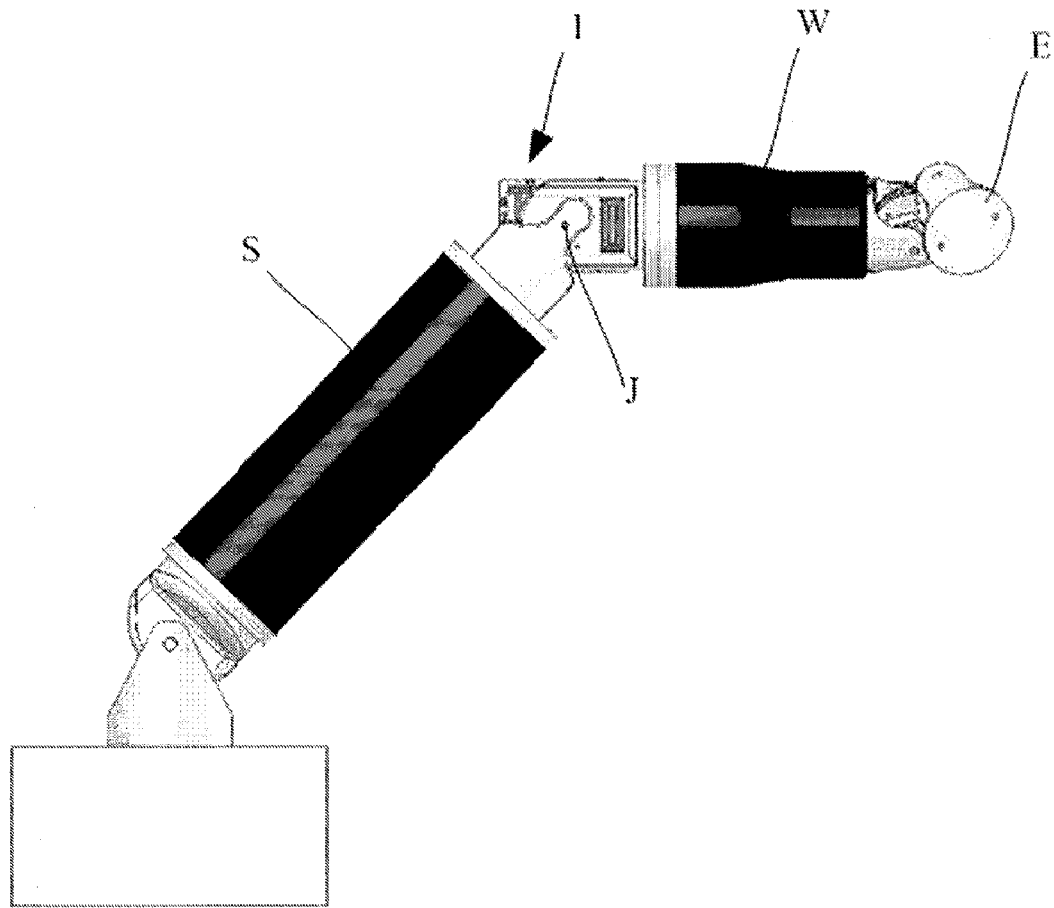

【Figure 20】
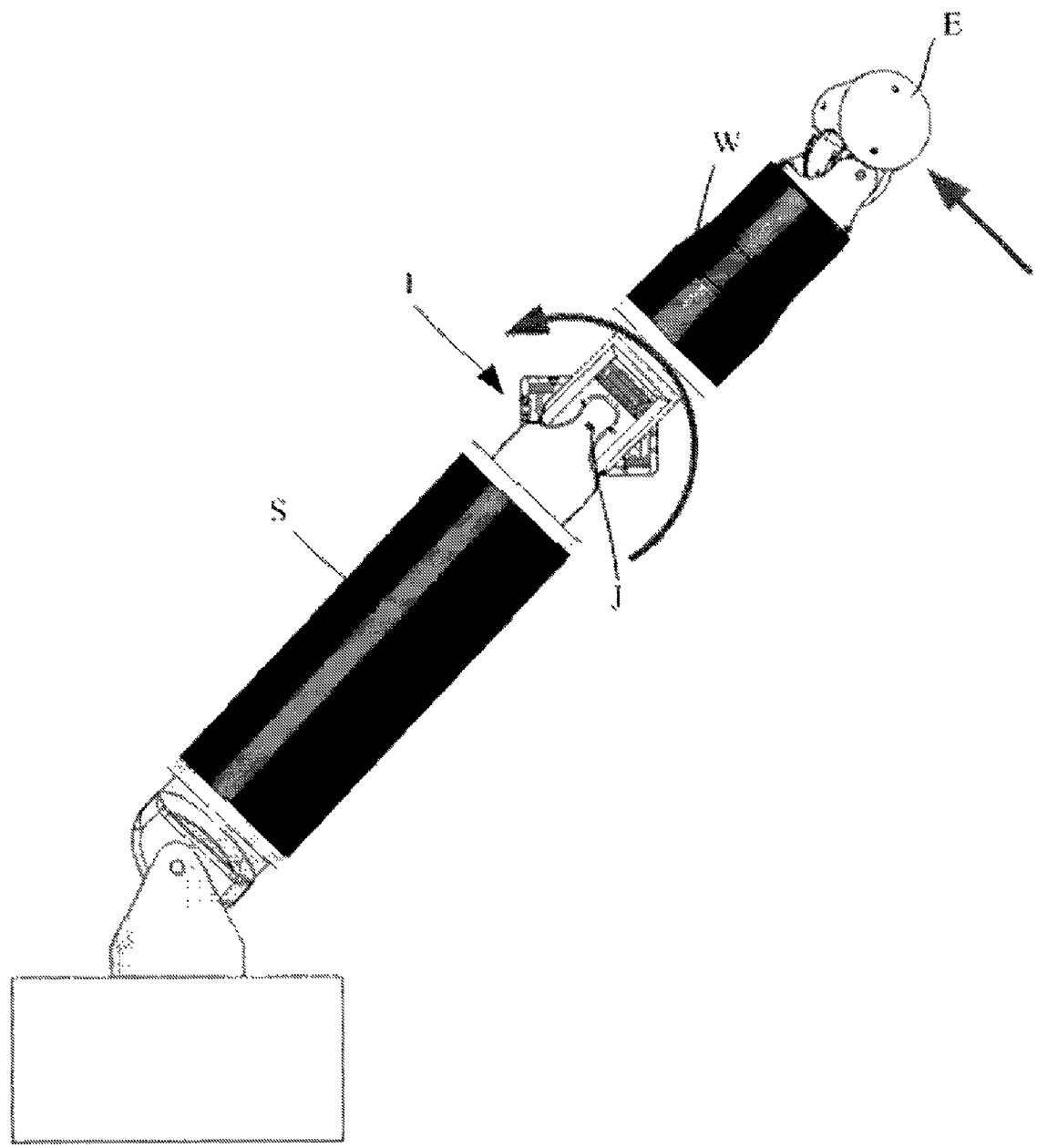

[Figure 21]
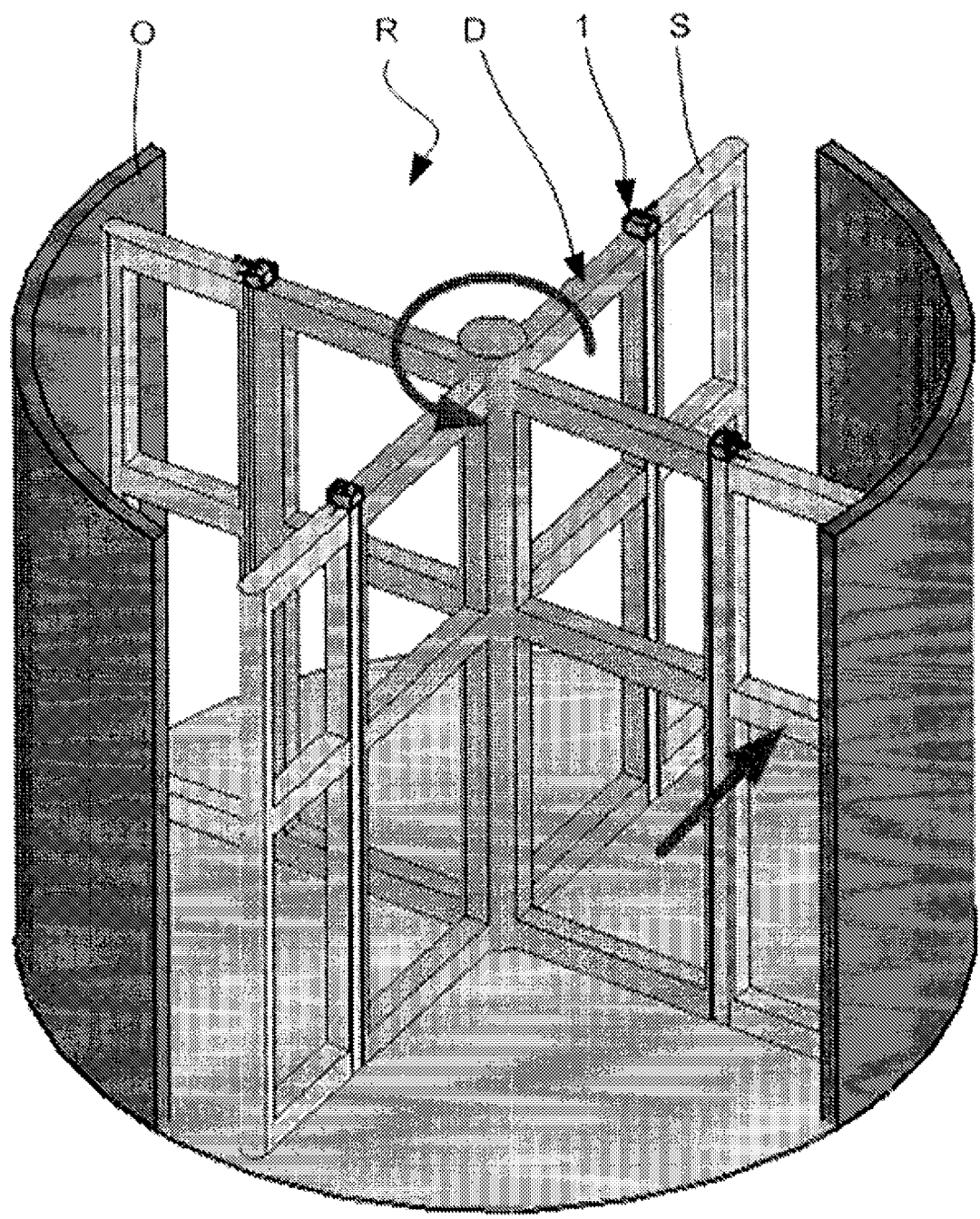

[Figure 22]
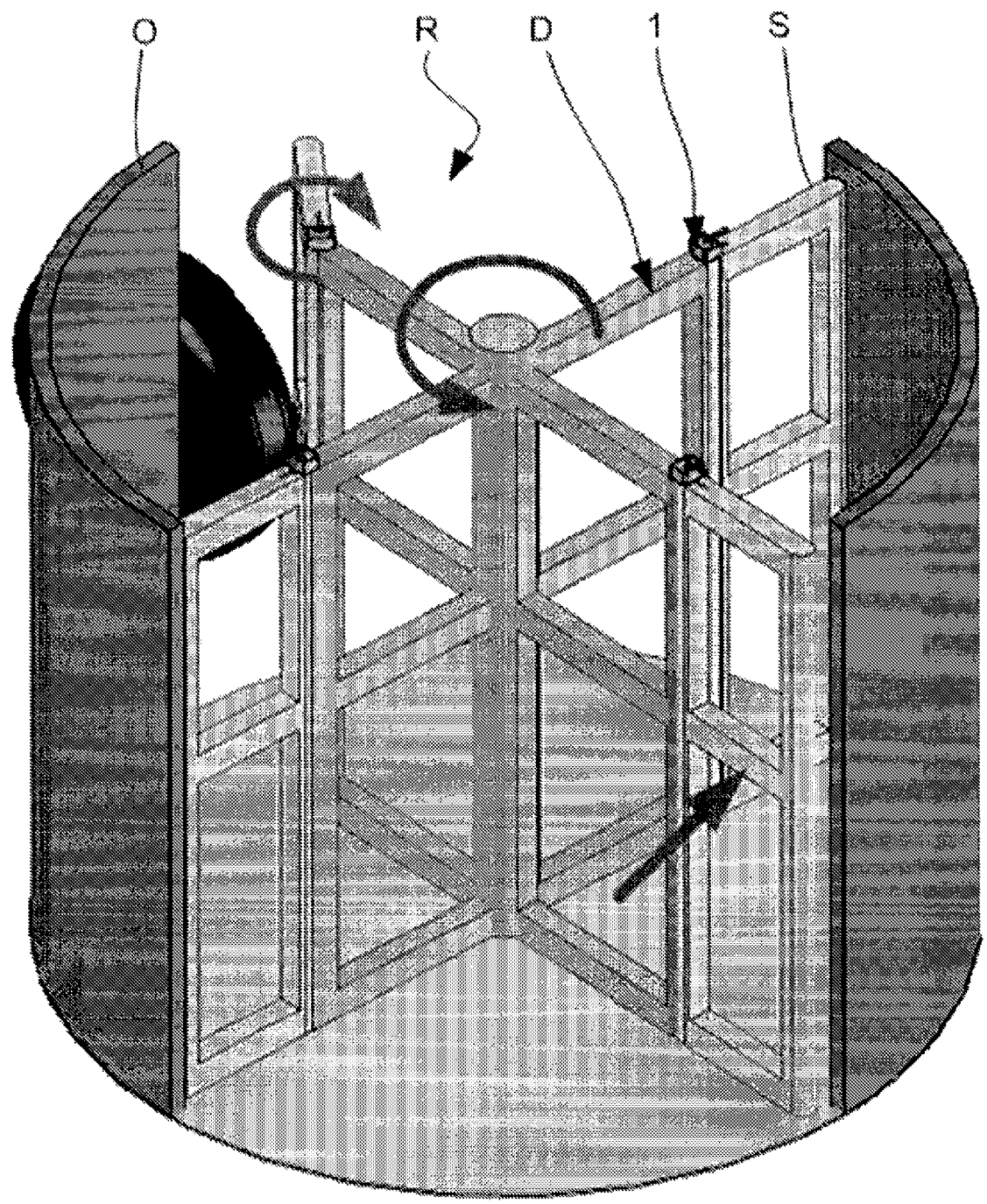

【Figure 23】
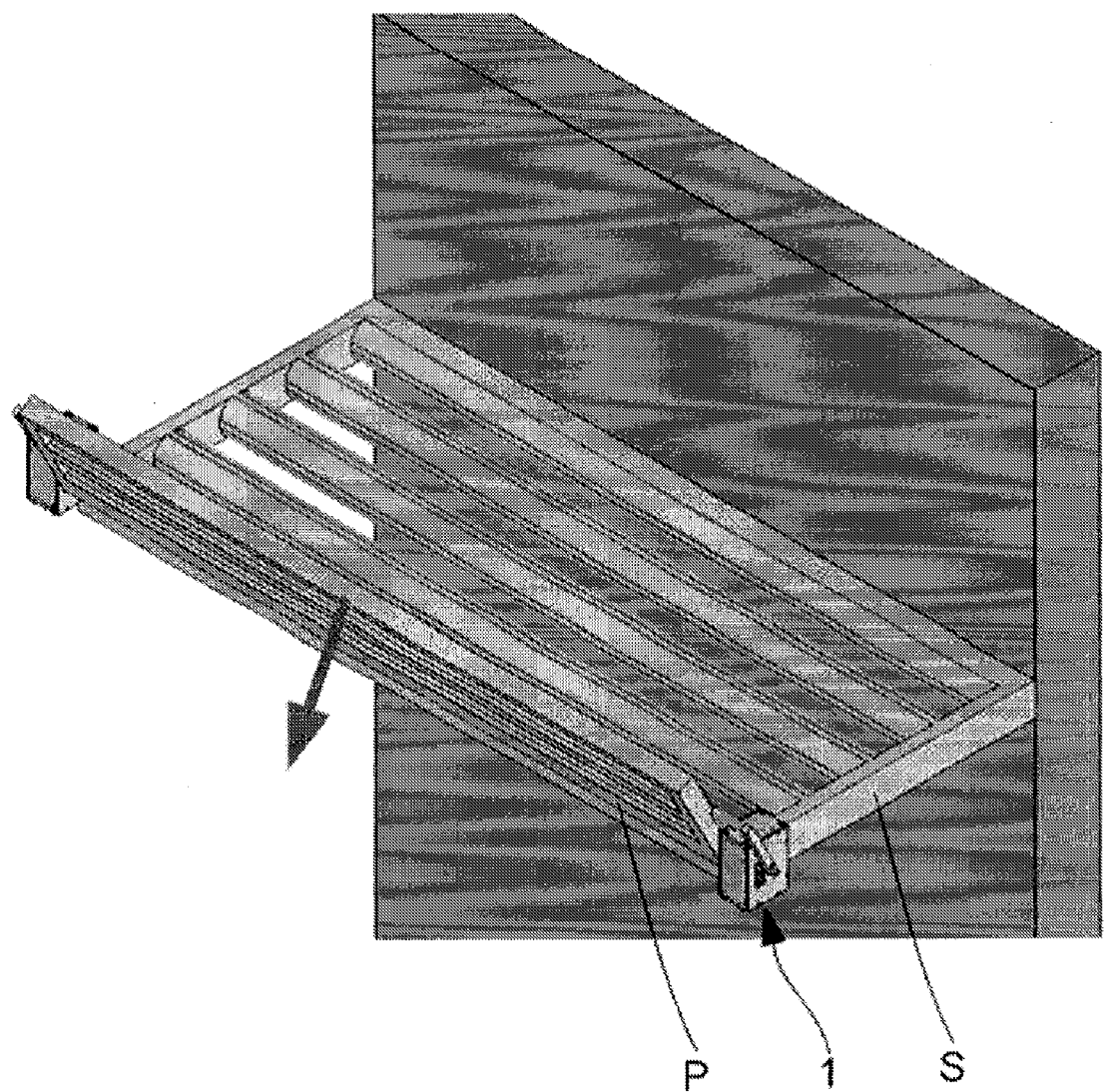

【Figure 24】
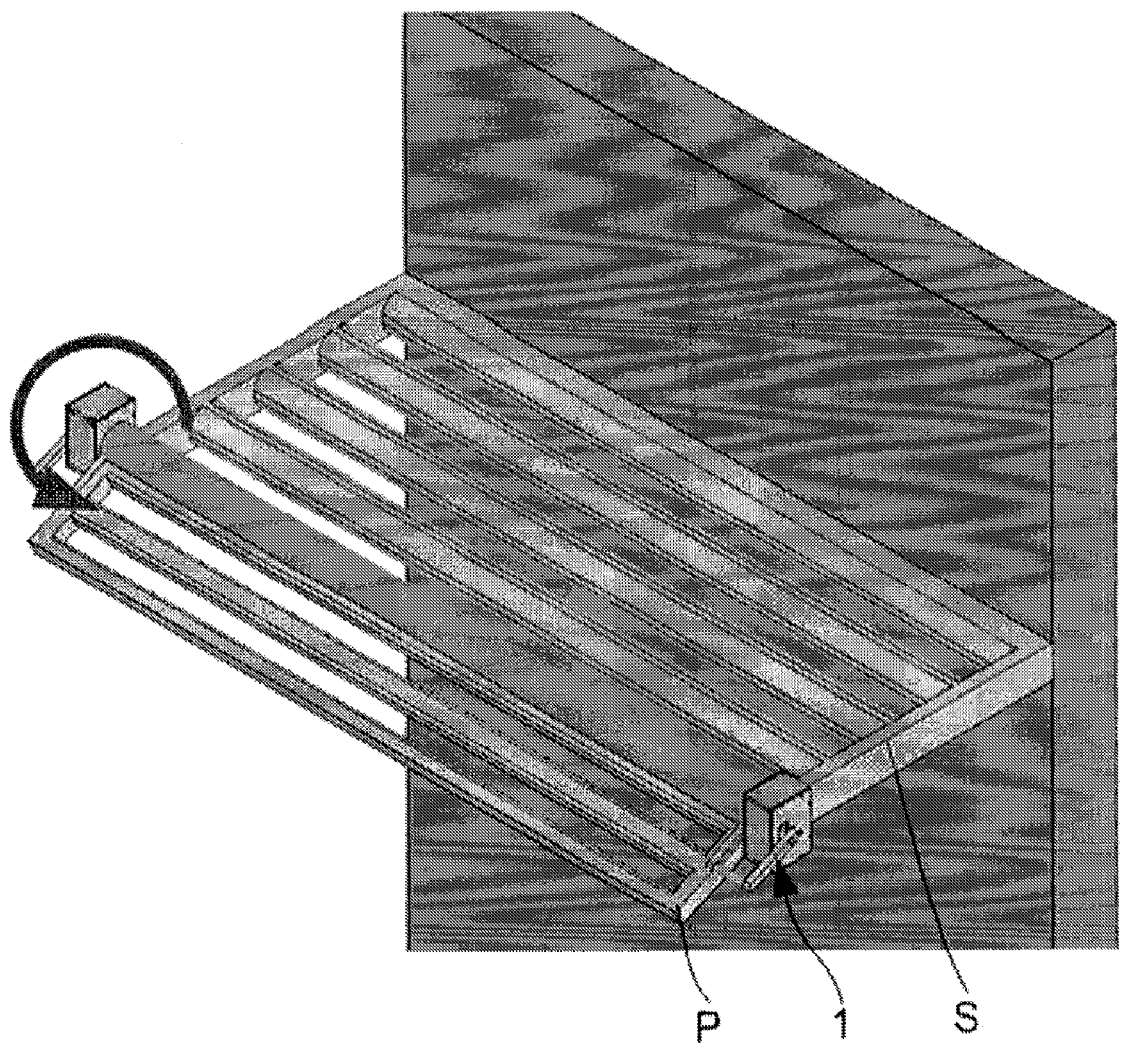

[Figure 25]
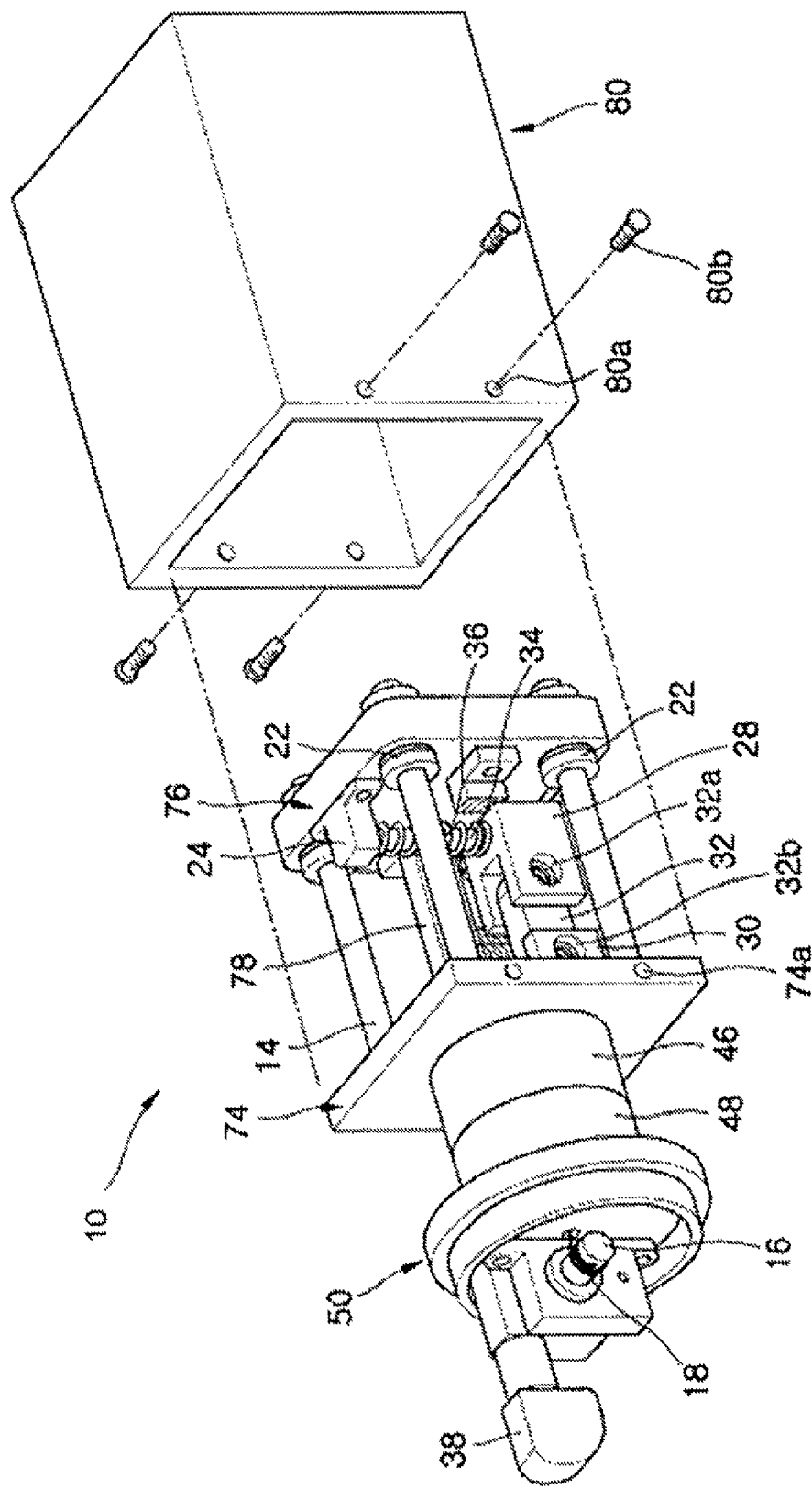

[Figure 26]
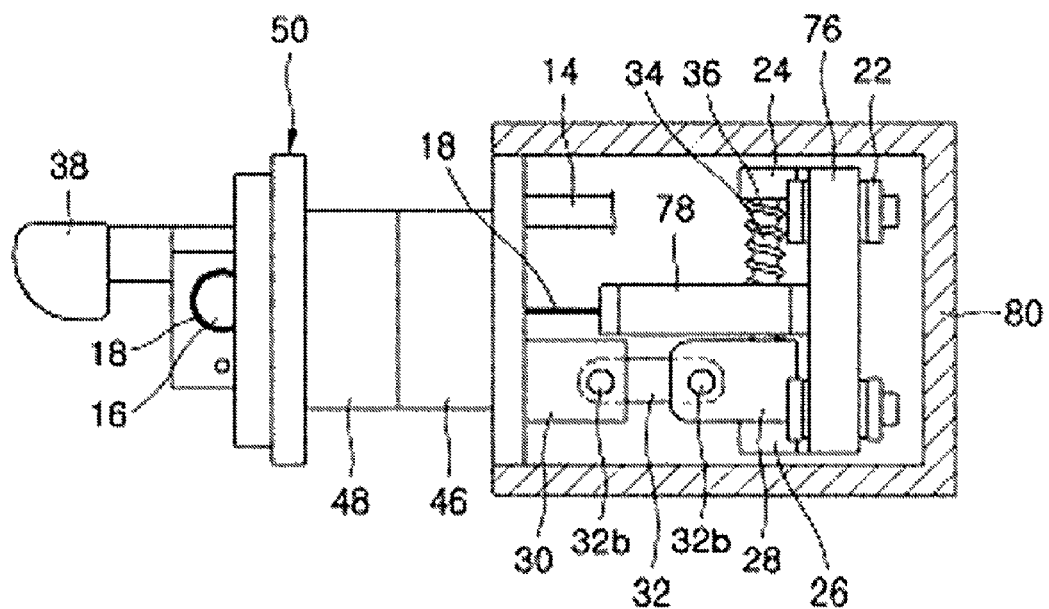
[Figure 27]
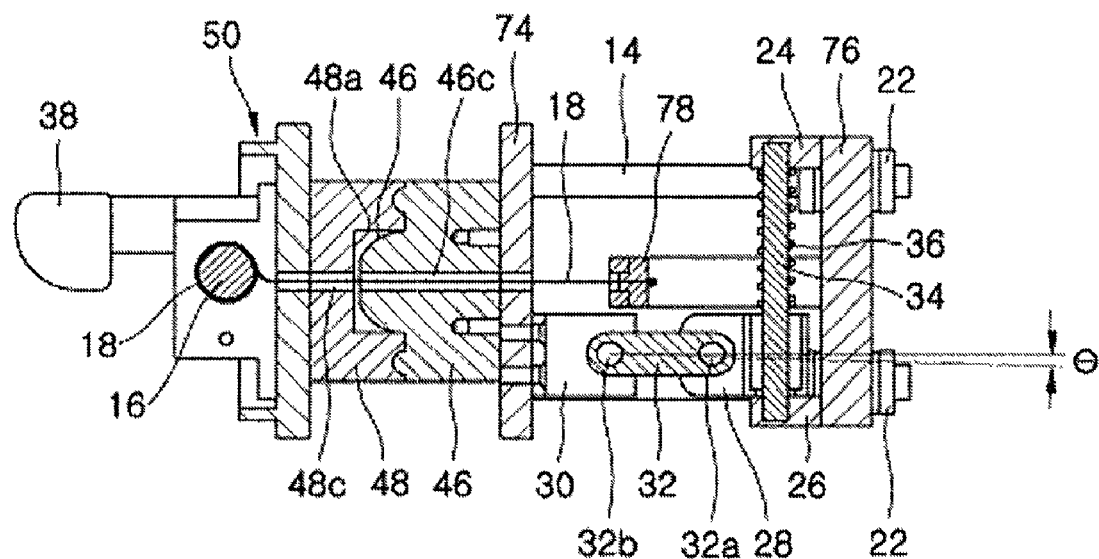

[Figure 28]
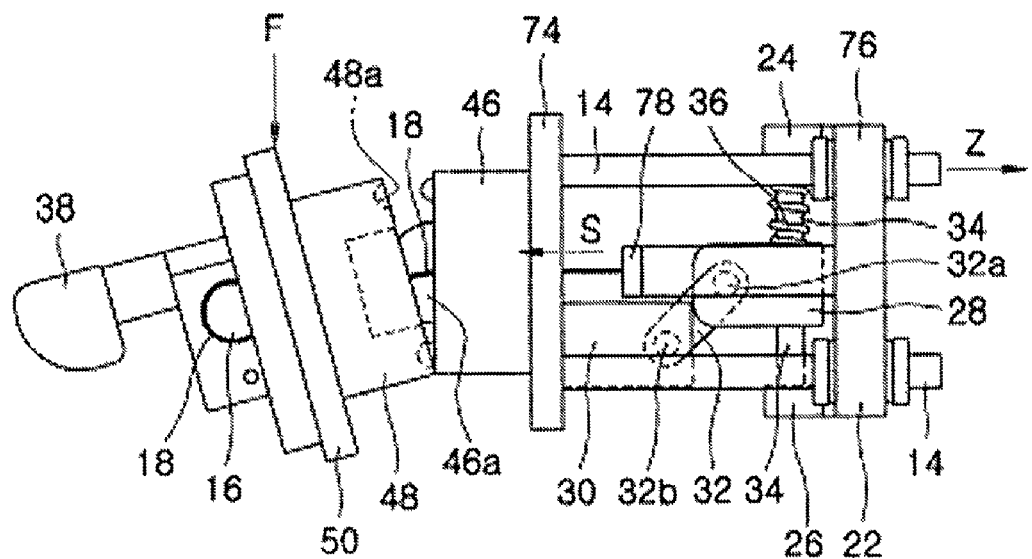
[Figure 29]
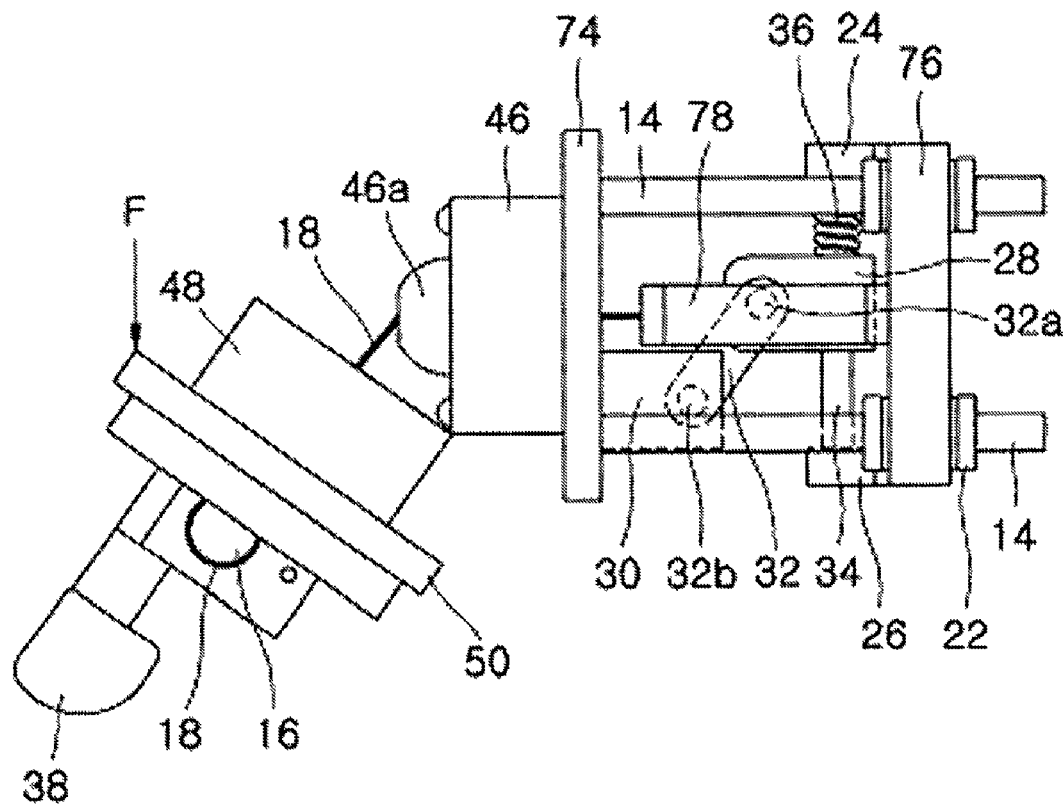

[Figure 30]
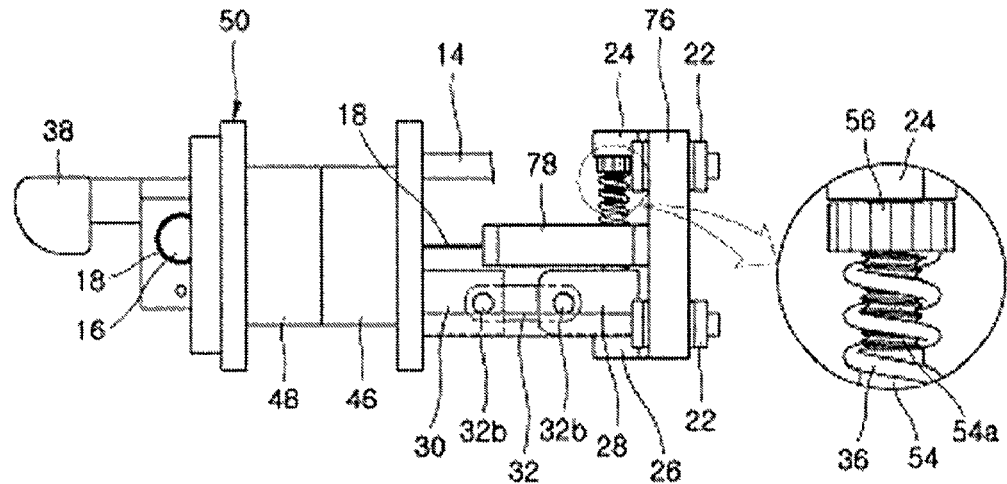
[Figure 31]
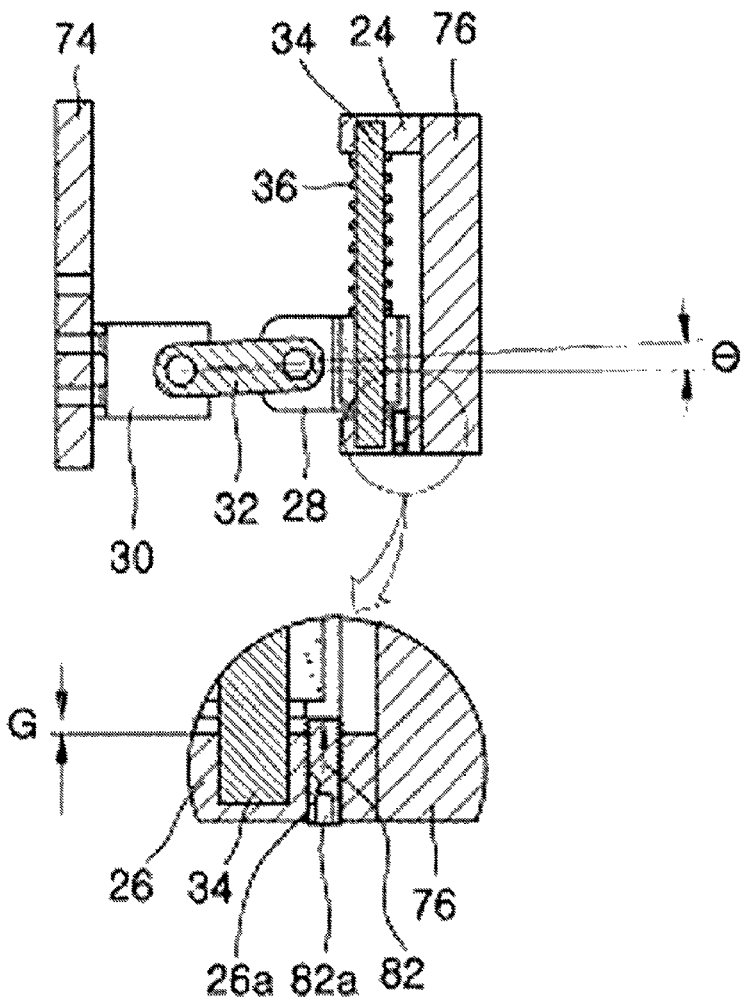

[Figure 32]
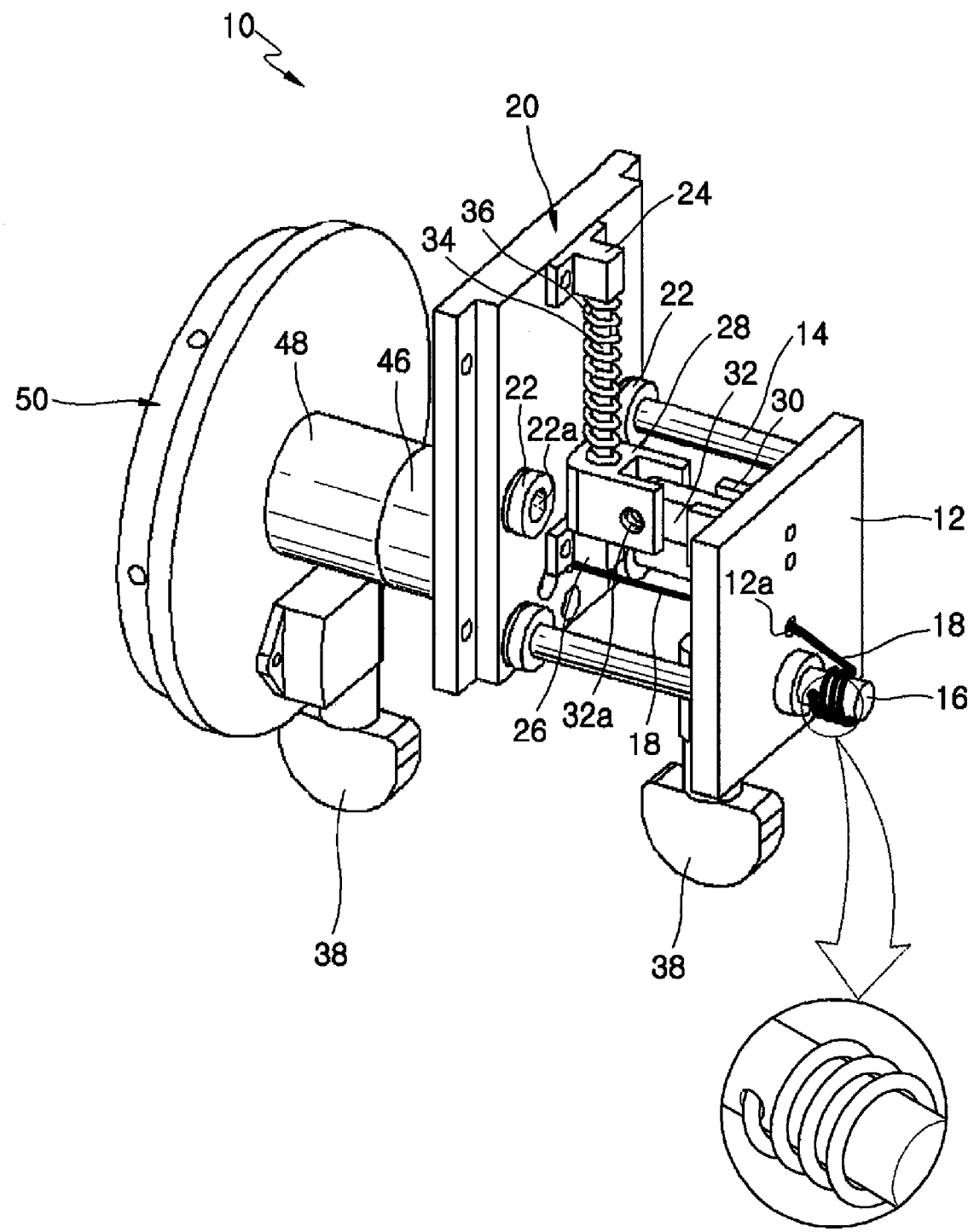

[Figure 33]
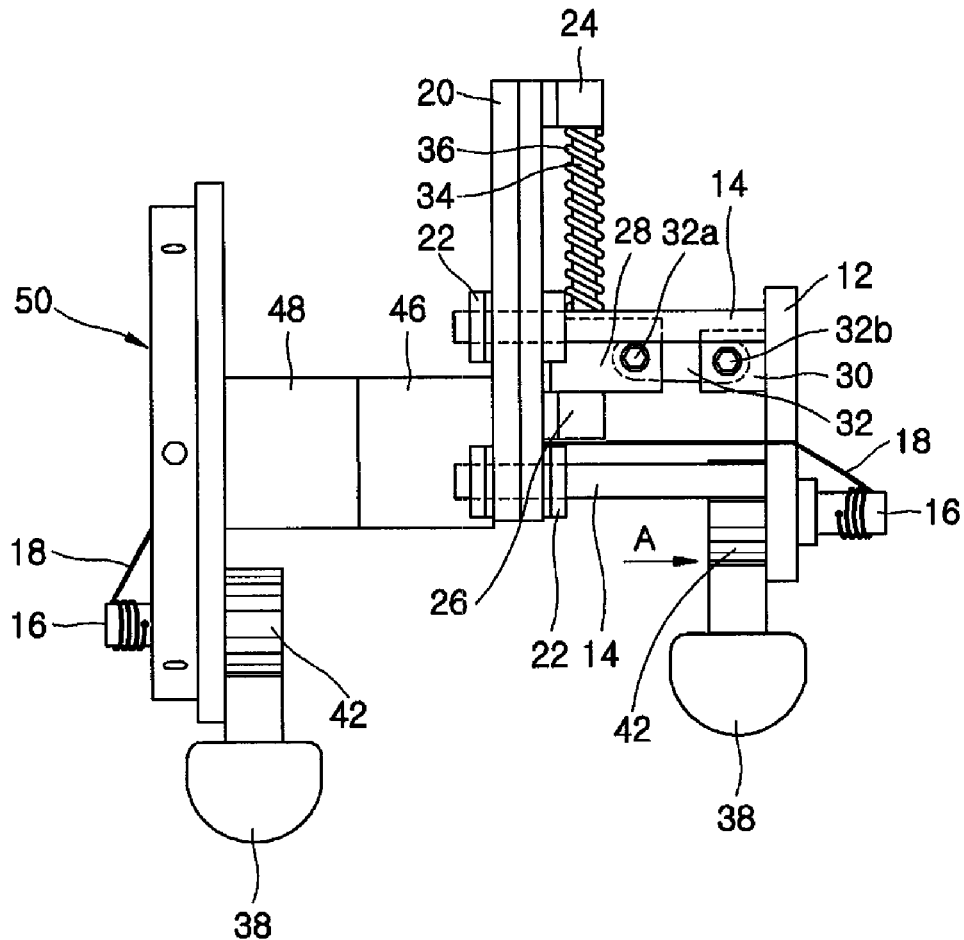
[Figure 34]
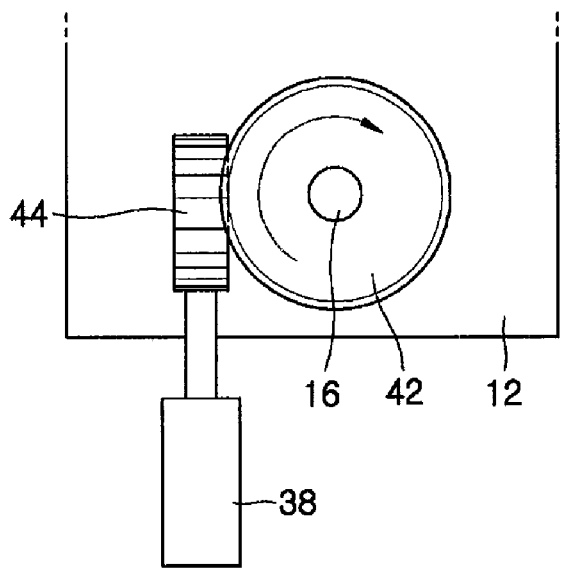

[Figure 35]
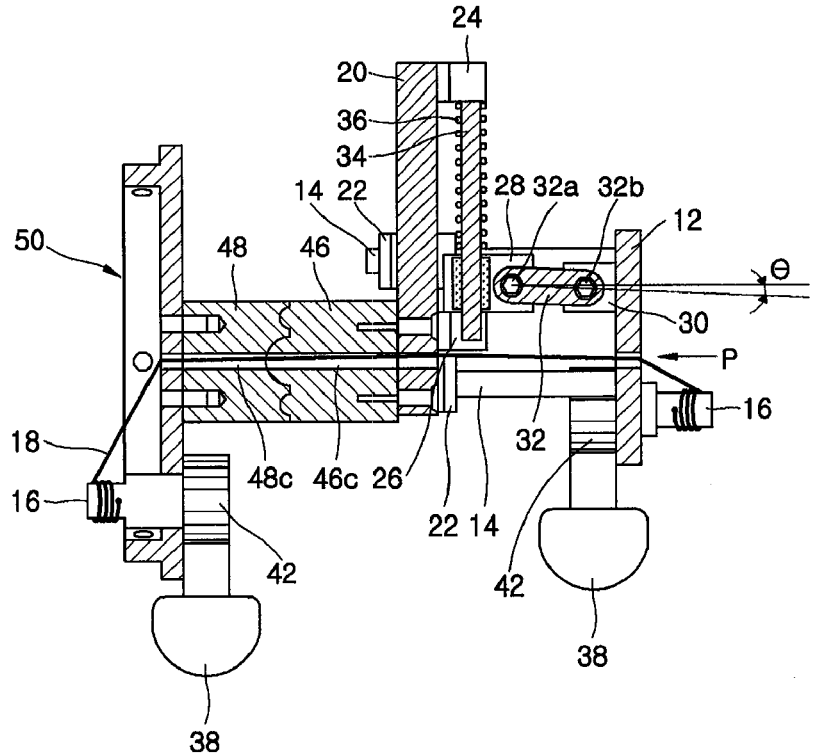
[Figure 36]
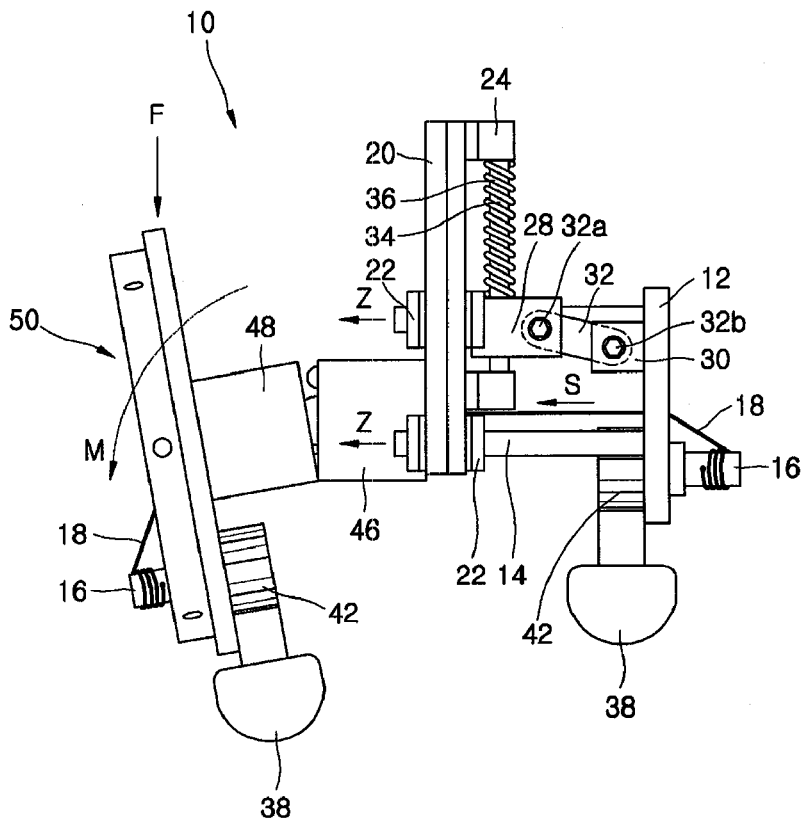

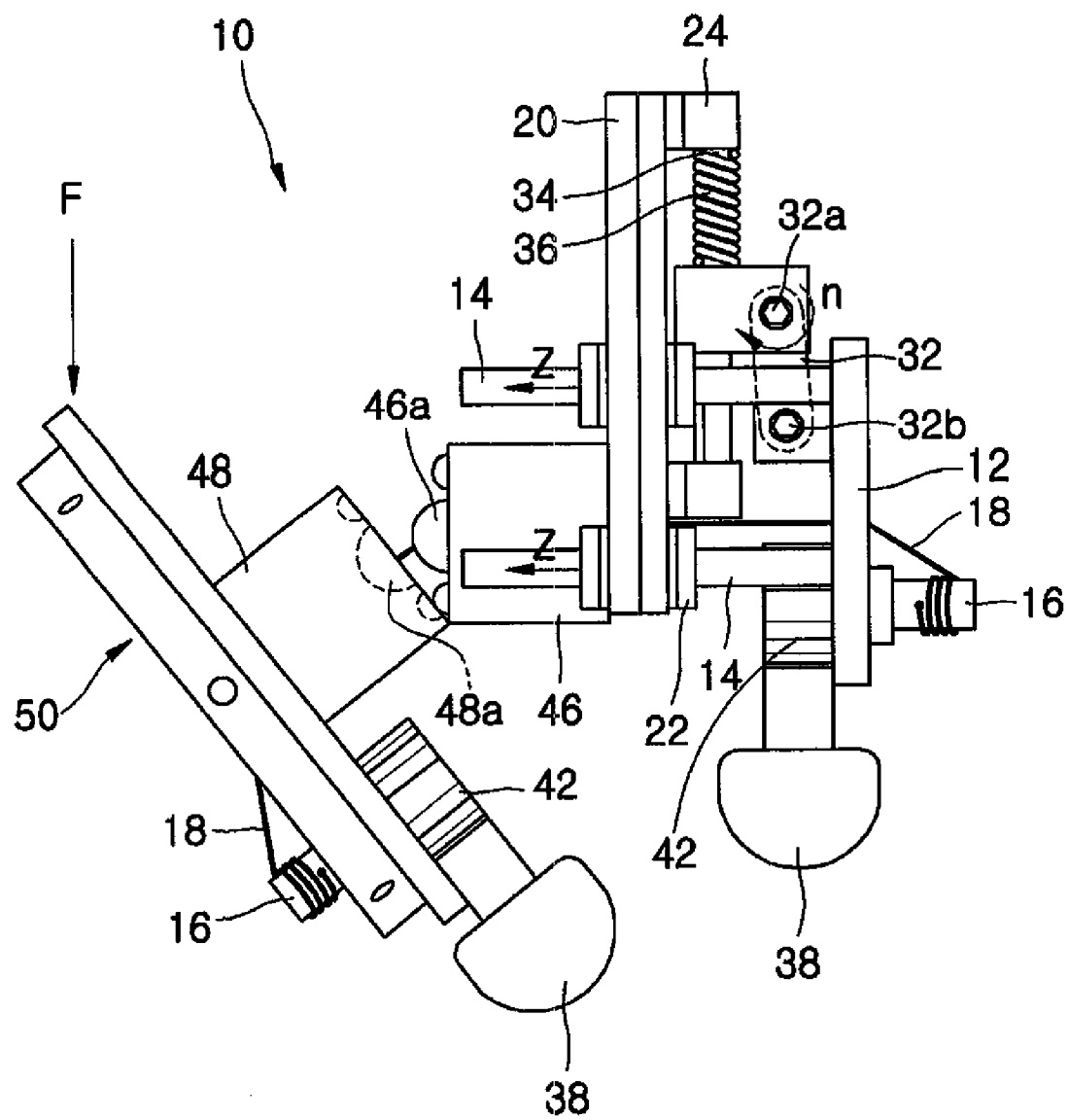
[Figure 37]

[Figure 38]
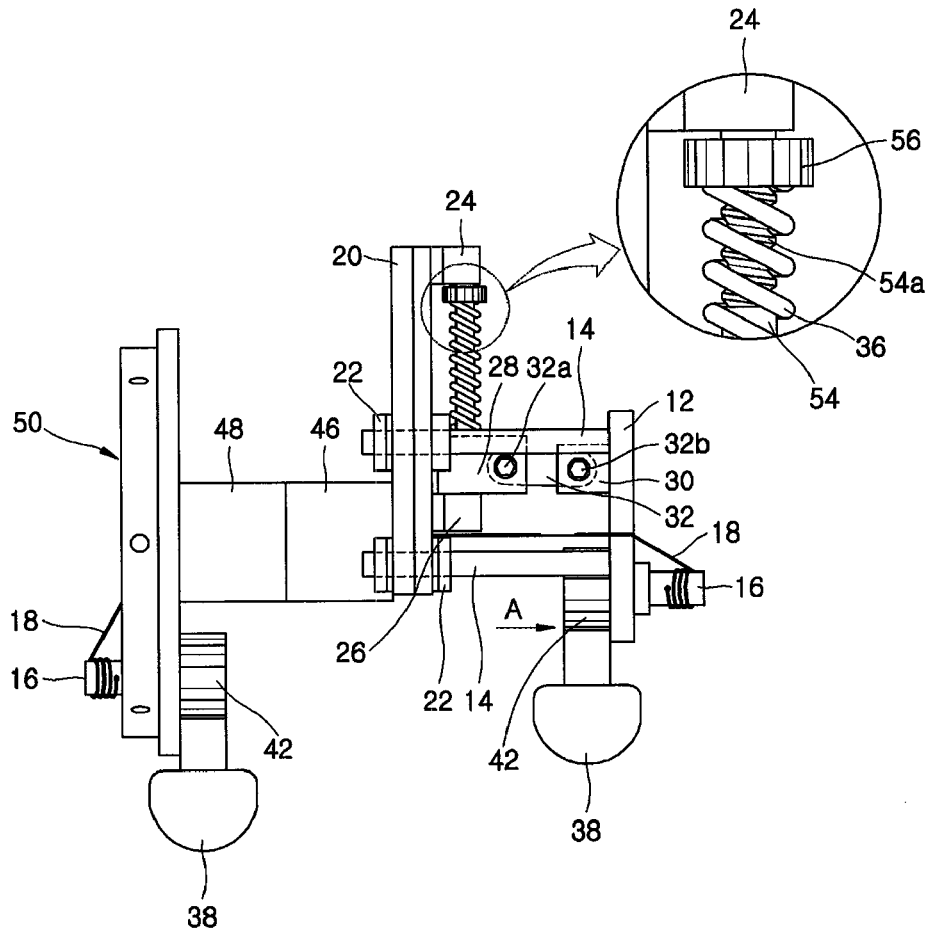
[Figure 39]
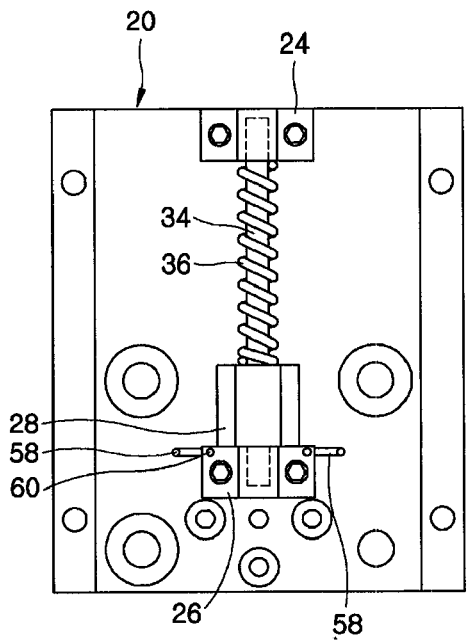

【Figure 40】
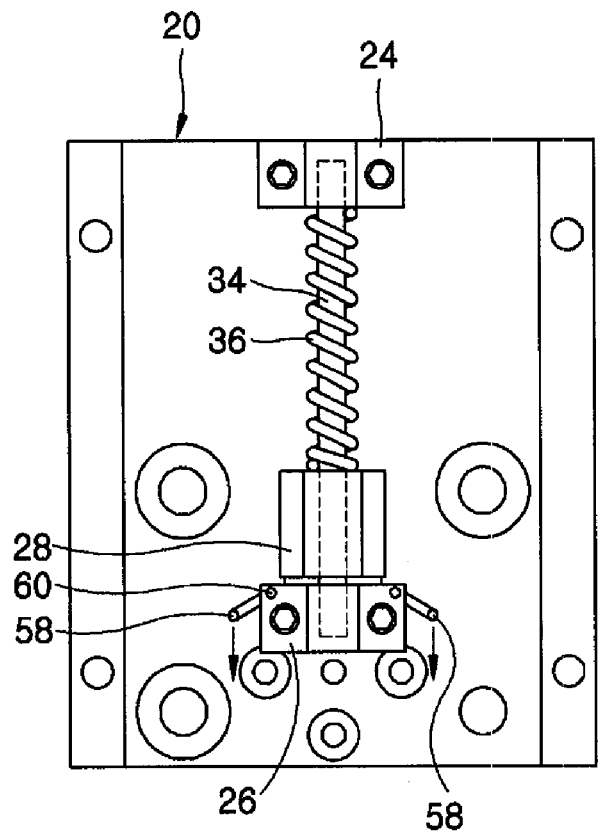
【Figure 41】
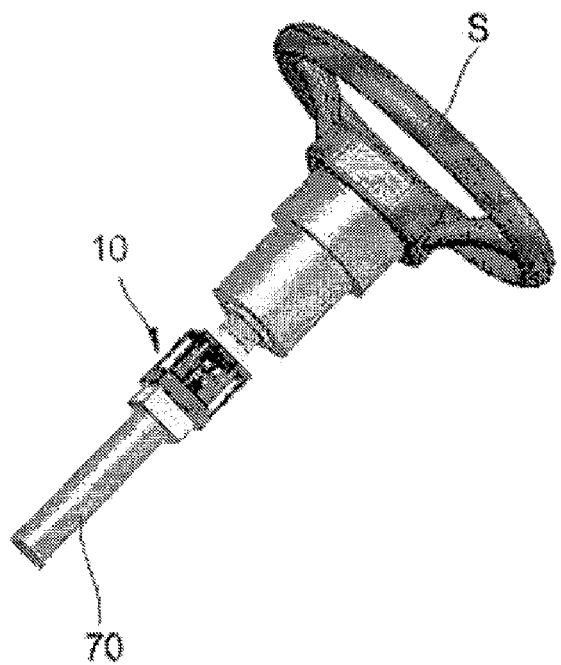

【Figure 42】
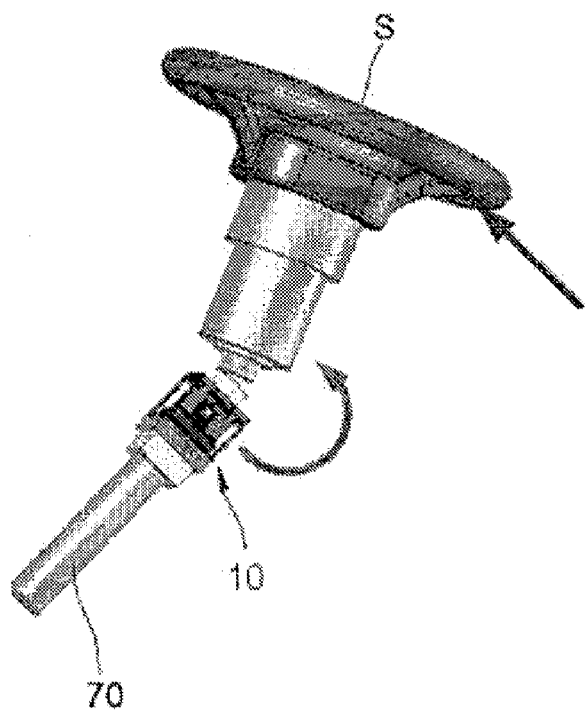
【Figure 43】
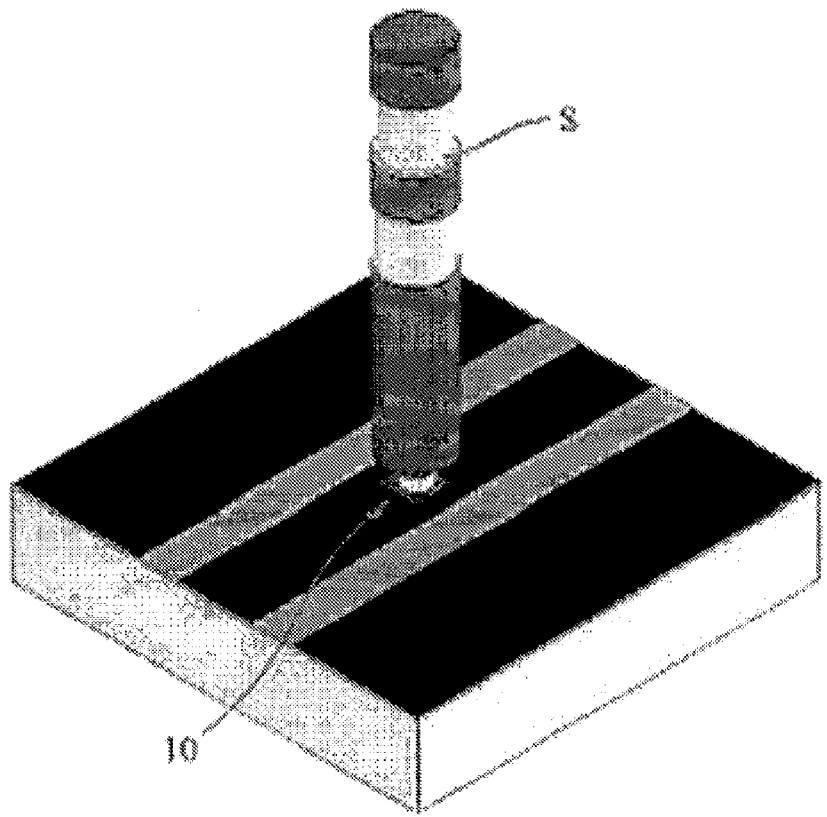

【Figure 44】
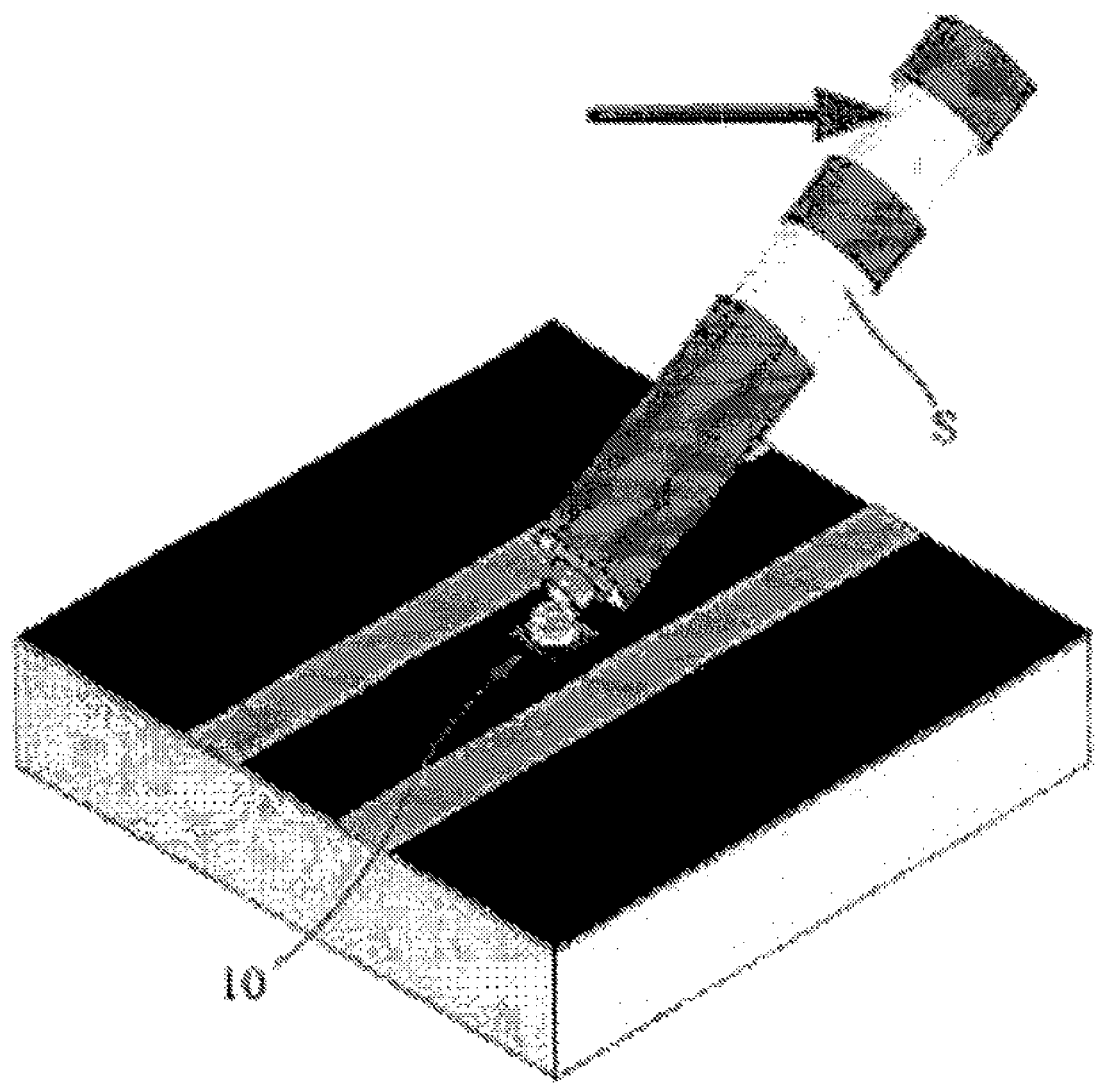

SAFETY UNIT AND SAFETY DEVICE WITH THE SAME

TECHNICAL FIELD

The present invention relates to a safety unit and a safety device, and more particularly, to a safety unit and a safety device having the same, in which when an external force having a value greater than a predetermined threshold value is exerted thereto, the safety unit easily surrenders to the external force to be broken off, thus accompanying a change in its outer appearance or structure, but when an external force having a value smaller than the predetermined threshold value is exerted thereto, there is little change in its outer appearance or structure.

BACKGROUND ART

Secure of safety is one of requirements which are indispensably needed for industrial facilities as well as mechanical equipment used in a daily life. For example, a robot used in automated industrial sites employs a variety of safety units and devices for reducing or preventing the risk of a safety accident within a hemispherical work envelope of the robot.

Such safety devices can be classified into an active control type and a passive control type depending on a scheme of performing a safety function. The active control-type safety device senses an external impact and actuates an actuator in response to the detected external impact so as to cope with the external impact. For example, when a robot collides with an external object, a sensor mounted in the robot senses whether or not the robot crashes into the external object and its collision strength and transfers the sensed information to a controller which in turn generates a control signal in response to a signal indicative of whether or not the robot crashes into the external object and its collision strength so as to drive the actuator to cope with the external impact. The passive control-type safety device copes with an external impact applied thereto on a basis of a buffer mechanical element (shock absorbing mechanical element) such as a spring or a damper, but does not adopt a sensor or a separate actuator.

The active control-type safety device entails a merit in that it can actively cope with a change in an external condition. Nevertheless, the impact between a robot and an actual object, for example, since most impacts between a robot arm and a worker occur within approximately 15 to 20 ms, an active control-consuming time through the sensor, the controller and the actuator is greater than the physical time, thus causing a limitation in an impact-absorbing effect by the active control type.

On the other hand, the passive control-type device entails a merit in that it does not require a sensor or a separate actuator, thereby reducing a manufacturing cost and absorbs an external impact using the shock absorbing mechanical element such as a spring or a damper, leading an increase in response speed and no risk of an erroneous operation. Nevertheless, the passive control-type device has a disadvantage that it is difficult to implement a desired non-linear stable control operation. For example, in case where a passive control-type safety device such as a spring is mounted at a joint of the robot as a safety device for use in the robot, there occurs shortcomings that the spring is deformed in proportion to even a daily external force that does not require the absorption of an external impact as well as the robot arm is drooped in proportion to the weight of an external object exerted to the spring, which makes it impossible to a desired operation through the robot arm.

DISCLOSURE

Technical Problem

Accordingly, the present invention has been made in view of the aforementioned problems occurring in the prior art, and it is an object of the present invention to provide a safety unit and a safety device having the safety unit, which takes a rigid structure whose stiffness (rigidity) is very high as if it had no spring when an external force having a value smaller than a predetermined threshold value is exerted thereto, but takes a flexible structure as if it were mounted with a spring whose stiffness is very small when an external force having a value greater than the predetermined threshold value is exerted thereto, such that it is selectively operated with respect to only a desired set range while securing a rapid response.

That is, the safety unit and the safety device have a non-linear characteristic in which it have a very high stiffness with respect to an external force having a value smaller than the predetermined threshold value, but has a very low stiffness with respect to an external force having a value greater than the predetermined threshold value using one device. In addition, after the structure of the safety device has been deformed with respect to a large impact due to an external force so as to absorb the impact, it returns to an original state when the external force has a value smaller than the predetermined threshold value. To this end, since the safety device employs only a combination of a spring and a mechanism, but not a separate sensor and actuator, it can be manufactured into a small size and its response speed against the external impact is very high. Furthermore, in case of the safety device, there is no risk of a failure or erroneous operation, thereby ensuring a high reliability.

Technical Solution

To accomplish the above object, according to one aspect of exemplary embodiments of the present invention, there is provided a safety unit comprising: a case; a rotary linkage disposed at one end thereof at the outside of the case and rotatably mounted at the other end thereof to the case; a force transfer shaft mounted to one side of the rotary linkage in such a fashion as to be oriented perpendicular to the rotating plane of the rotary linkage; a crank linkage rotatably mounted at one end thereof to the inner side of the case and adapted to abut against the force transfer shaft at the outer circumferential edge thereof so as to be transferred with an external force to be rotatably moved; and a support means rotatably connected to the other end of the crank linkage and adapted to allow for the rotation of the crank linkage when an external force having a value larger than a predetermined threshold value is exerted to the rotary linkage.

In a preferred embodiment of the safety unit, the support means may comprise: a connection link rotatably connected at one end thereof to the other end of the crank linkage; a slider guide shaft disposed at the inner side of the case; a slider rotatably connected at one side thereof to the other end of the connection link so as to be guided and slidably moved along the slider guide shaft; and an elastic member supported at one end thereof by the slider and at the other end thereof by the inner wall of the case so as to impart an elastic force to the slider, wherein a normal line of the slider guide shaft and a longitudinal line segment of the connection link intersect each other.

In a preferred embodiment, the crank linkage and the support means may be respectively provided in pair numbers in such a fashion that their respective pairs are arranged symmetrical to each other with respect to the rotary linkage so as to support bi-directional rotation of the rotary linkage, and wherein the pair of slider guide shafts are arranged in parallel with each other. In a preferred embodiment, the crank linkage may further comprise a force transfer shaft-accommodating portion formed at the outer circumferential edge thereof for accommodating the force transfer shaft. Also the force transfer shaft may be movably arranged in the perpendicular direction to the longitudinal direction of the rotary linkage so as to adjust the angle between the longitudinal line segment of the connection link and the normal line of the slider guide shaft.

In a preferred embodiment, the crank linkage and the support means may be respectively provided in pair numbers in such a fashion that their respective pairs are arranged symmetrical to each other with respect to the rotary linkage so as to support bi-directional rotation of the rotary linkage, and wherein the longitudinal line segments of the pair of slider guide shafts intersect each other when viewed from the rotating plane of the rotary linkage.

In a preferred embodiment, the slider guide shaft may be disposed to pass through the elastic member and the support means may further comprise an elastic force-adjusting means disposed at one end of the slider guide shaft in such a fashion as to be arranged between the elastic member and the case for adjusting the elastic force of the elastic member.

In a preferred embodiment, the support means may comprise: a connection link rotatably connected at one end thereof to the other end of the crank linkage; a sliding roller rotatably connected to the other end of the connection link; a sliding roller guide slot formed in the case for slidably guiding the sliding roller therein; and an elastic member supported at one end thereof by the inner side of the case and abutted against the sliding roller at the other end thereof to pressurize the sliding roller with a torsional elastic force thereof, wherein a normal line of the sliding face of the sliding roller guide slot and a longitudinal line segment of the connection link intersect each other.

According to still another aspect of exemplary embodiments of the present invention, there is also provided a safety unit comprising: a fixing plate; a guide section fixedly mounted at one end thereof to one surface of the fixing plate; a movable plate disposed spaced apart from the fixing plate in such a fashion as to be slidably guided by the guide section to be relatively moved with respect to the fixing plate; a division shaft mounted at one end thereof to the other surface of the fixing plate to be opposite to the case, the division shaft including a pair of opposed shaft members detachably coupled to each other for transmitting the power at a state where they are in close contact with each other; an adaptor mounted to the other end of the division shaft for connecting the division shaft with external constituent elements; a wire connected at one end thereof to the adaptor and at the end thereof to the movable plate in such a fashion as to extend penetrating through the inside of the division shaft and the fixing plate; and a support means disposed between the fixing plate and the movable plate in such a fashion that the fixing plate and the movable plate are spaced apart from each other, the support means allowing for the relative movement of the movable plate with respect to the fixing plate when an external force having a value larger than a predetermined threshold value is exerted to the movable plate via the wire.

In a preferred embodiment of the safety unit, the support means may comprise: a connection link rotatably mounted at one end thereof to one surface of the fixing plate; a slider guide shaft mounted to one surface of the movable plate in such a fashion as to be oriented perpendicular to the movement direction of the movable plate; a slider rotatably connected at one side thereof to the other end of the connection link so as to be guided and slidably moved along the slider guide shaft; and an elastic member abutted against the other side of the slider at one end thereof so as to impart an elastic force to the slider in the longitudinal direction of the slider guide shaft to allow the fixing plate and the movable plate to be maximally spaced apart from each other; wherein a normal line of the slider guide shaft and a longitudinal line segment of the connection link intersect each other.

In a preferred embodiment, the slider guide shaft may be supported by a fixing block mounted to one surface of the movable plate, and wherein the safety unit may further comprise a slider position control section including a height-adjusting through-hole penetratingly formed in the second fixing block adjacent to the slider in the longitudinal direction of slider guide shaft, and a height-adjusting member supportably abutted at one end thereof against one end of the slider while passing through the height-adjusting through-hole for adjusting the height of the slider.

In a preferred embodiment, the slider guide shaft may be disposed to pass through the elastic member and the support means further comprises an elastic force-adjusting means adapted to abut against an opposite end to one end of the elastic member abutting against the slider and displaceably moved along the slider guide shaft so as to adjust the elastic force of the elastic member.

In a preferred embodiment, the division shaft may be formed of two opposed shaft members and one of the two opposed shaft members may have a protrusion formed on one side surface thereof and the other of the two opposed shaft members may have a recess formed on one side surface thereof to confront the protrusion for accommodating the protrusion therein.

In a preferred embodiment, the adaptor may be provided at one surface thereof with a wire reel around which one end of the wire is fixed, and with a tension-adjusting means for adjusting a tension applied to the wire while rotatably supporting the wire reel.

In a preferred embodiment, the support means may comprises: a connection link rotatably mounted at one end thereof to one surface of the movable plate; a slider guide shaft mounted to one surface of the fixing plate in such a fashion as to be oriented perpendicular to the movement direction of the movable plate; a slider rotatably connected at one side thereof to the other end of the connection link so as to be guided and slidably moved along the slider guide shaft; and an elastic member abutted against the other side of the slider at one end thereof so as to impart an elastic force to the slider in the longitudinal direction of the slider guide shaft to allow the fixing plate and the movable plate to be maximally spaced apart from each other; wherein a normal line of the slider guide shaft and a longitudinal line segment of the connection link intersect each other.

According to yet another aspect of exemplary embodiments of the present invention, there is also provided a safety device comprising a first link, a second link, and a safety unit disposed between the first and second links, wherein the safety unit includes: a case fixedly mounted to one side of one of the first link and the second link, a rotary linkage fixedly mounted at one end thereof to one side of the other of the first link and the second link and rotatably mounted at the other end thereof to the case, a force transfer shaft mounted to one side of the rotary linkage in such a fashion as to be oriented perpendicular to the rotating plane of the rotary linkage; a crank linkage rotatably mounted at one end thereof to the inner side of the case and adapted to abut against the force transfer shaft at the outer circumferential edge thereof so as to be transferred with an external force to be rotatably moved; and a support means rotatably connected to the other end of the crank linkage and adapted to allow for the rotation of the crank linkage when an external force having a value larger than a predetermined threshold value is exerted to the rotary linkage through the first link or the second link.

According to a further aspect of exemplary embodiments of the present invention, there is also provided a safety device comprising a first link, a second link, and a safety unit disposed between the first and second links, wherein the safety unit includes: a fixing plate fixedly mounted to one side of one of the first link and the second link, a guide section fixedly mounted at one end thereof to one surface of the fixing plate; a movable plate disposed spaced apart from the fixing plate in such a fashion as to be slidably guided by the guide section to be relatively moved with respect to the fixing plate; a division shaft mounted at one end thereof to the other surface of the fixing plate to be opposite to the case, the division shaft including a pair of opposed shaft members detachably coupled to each other for transmitting the power at a state where they are in close contact with each other; an adaptor mounted to the other end of the division shaft for connecting the division shaft with one side of the other of the first link and the second link; a wire connected at one end thereof to the adaptor and at the end thereof to the movable plate in such a fashion as to extend penetrating through the inside of the division shaft and the fixing plate; and a support means disposed between the fixing plate and the movable plate in such a fashion that the fixing plate and the movable plate are spaced apart from each other, the support means allowing for the relative movement of the movable plate with respect to the fixing plate when an external force having a value larger than a predetermined threshold value is exerted to the movable plate via the wire.

Advantageous Effects

The safety unit according to the present invention provides a passive control-type safety device through a simple structure so that an excellent response and reliability are secured and simultaneously a manufacturing cost are reduced, thus accompanying an effect of improving productivity.

Further, the safety unit according to the present invention can be easily and simply implemented through a simple structure to minimize an installation and working space, so that compact modularization of facilities including the safety unit is possible and the safety unit can be realized as a safety device for securing safety in a robot arm, a revolving door, a side view mirror for automobiles, a power steering system for automobiles, a bumper, road safety facilities, and various systems and facilities in which an impact or collision can occur through the compact modularization.

DESCRIPTION OF DRAWINGS

The above and other objects, features and advantages of the present invention will be more apparently understood from the following detailed description of the preferred embodiments of the invention in conjunction with the accompanying drawings, in which:

FIG. 1 is a schematic exploded perspective view illustrating a safety unit according to a first embodiment of the present invention;

FIG. 2 is a front view illustrating the safety unit shown in FIG. 1;

FIG. 3 is a partial cross-sectional view illustrating the inner construction of the safety unit shown in FIG. 1;

FIGS. 4 and 5 are views showing the operational mechanism of the safety unit shown in FIG. 1;

FIG. 6 is a front view illustrating another example of the safety unit according to the first embodiment of the present invention;

FIGS. 7 and 8 are front views showing a position-adjusting method of a rotary linkage of the safety unit according to the first embodiment of the present invention;

FIGS. 9 and 10 are partial perspective views illustrating the position-adjusting method of the rotary linkage;

FIG. 11 is a schematic exploded perspective view illustrating a safety unit according to a second embodiment of the present invention;

FIG. 12 is a front view illustrating the safety unit shown in FIG. 11;

FIGS. 13 and 14 are views showing the operational mechanism of the safety unit shown in FIG. 11;

FIG. 15 is a schematic exploded perspective view illustrating a safety unit according to a third embodiment of the present invention;

FIG. 16 is a front view illustrating the safety unit shown in FIG. 15;

FIGS. 17 and 18 are views showing the operational mechanism of the safety unit shown in FIG. 15;

FIGS. 19 and 20 are schematic perspective view illustrating one example of a safety device including the safety unit according to the first, second and third embodiments of the present invention;

FIGS. 21 and 22 are schematic perspective views illustrating other examples of the safety device including the safety unit according to the first, second and third embodiments of the present invention;

FIGS. 23 and 24 are schematic perspective views illustrating other examples of the safety device including the safety unit according to the first, second and third embodiments of the present invention;

FIG. 25 is a schematic exploded perspective view illustrating a safety unit according to a fourth embodiment of the present invention;

FIG. 26 is a view showing a support means of the safety unit shown in FIG. 25;

FIG. 27 is a cross-sectional view illustrating the safety unit shown in FIG. 25;

FIGS. 28 and 29 are views showing the operational mechanism of the safety unit shown in FIG. 25;

FIG. 30 is a cross-sectional view illustrating another example of a safety unit according to the fourth embodiment of the present invention;

FIG. 31 is a partial cross-sectional view showing a position-adjusting method of a slider of the safety unit according to the fourth embodiment of the present invention;

FIG. 32 is an exploded perspective view illustrating a safety unit according to a fifth embodiment of the present invention;

FIG. 33 is a front view illustrating the safety unit shown in FIG. 32;

FIG. 34 is a schematic view viewed from the direction of an arrow A in FIG. 33;

FIG. 35 is a schematic partial cross-sectional view illustrating the inner construction of the safety unit shown in FIG. 32;

FIGS. 36 and 37 are views showing the operational mechanism of the safety unit shown in FIG. 25;

FIG. 38 is a view illustrating another example of the safety unit according to the fifth embodiment of the present invention;

FIGS. 39 and 40 are schematic views showing partial cross-sectional view showing a position-adjusting method of a slider of another example of the safety unit according to the fifth embodiment of the present invention;

FIGS. 41 and 42 are views showing schematic perspective view illustrating one example of a safety device including the safety unit according to the fourth and fifth embodiments of the present invention; and FIGS. 43 and 44 are views showing schematic perspective view illustrating other examples of a safety device including the safety unit according to the fourth and fifth embodiments of the present invention.

MODE FOR INVENTION

Hereinafter, the present invention will be described in detail.

Basically, a safety joint device and a safety link device having a non-linear characteristic according to an embodiment of the present invention, i.e., a safety unit has a basic mechanism in which when an external force having a value smaller than a predetermined threshold value is exerted thereto, the safety unit endures the external force so as not to be deformed in its outer appearance or structure whereas when an external force having a value greater than a predetermined threshold value is exerted thereto, the safety unit easily surrenders to the external force so as to be deformed in its outer appearance or structure, thereby absorbing the external impact. Reference will now be made in detail to preferred embodiments of the present invention with reference to the attached drawings. The same elements are denoted by the same reference numerals for the sake of clarity and conciseness.

FIG. 1 is a schematic exploded perspective view illustrating a safety unit 1 according to a first embodiment of the present invention, FIG. 2 is a front view illustrating the construction of the safety unit shown in FIG. 1, wherein a third case 88 is excluded, and FIG. 3 is a partial cross-sectional view illustrating the inner construction of the safety unit shown in FIG. 1. Referring to FIGS. 1 to 3, the safety unit 1 according to the present invention includes a case 83 to 88, a rotary linkage 52, a force transfer shaft 51, a crank linkage 35, and a support means. The support means is rotatably connected to any one end of the crank linkage 35, and allows for the rotation of the crank linkage when an external force having a value larger than a predetermined threshold value is exerted to the crank linkage.

The support means of the safety unit 1 according to the first embodiment of the present invention includes a connection link 32, a slider guide shaft 34, a slider 28 and an elastic member. The crank linkage 35 and the support means is constructed such that they are opposed to each other with respect to the rotary linkage 52. In this embodiment, the crank linkage 35, the connection link 32 and the support means are respectively provided in pair numbers so as to support bi-directional rotation of the rotary linkage 52 in such a fashion that their respective pairs are arranged symmetrical to each other with respect to the rotary linkage. This arrangement is an example for explaining one embodiment of the present invention. In this case, the respective constituent elements may have a construction formed in a single number and may be modified in various manners. That is, the safety unit includes the crank linkage 35 and the support means in a single number so that it may have a restriction structure in which the rotary linkage can rotate only in one direction in which the crank linkage and the support means are provided, but is limited in rotation in the other direction. For the sake of clarity of explanation, in this embodiment, a construction will be described which supports the bi-directional rotation of the rotary linkage 52.

The case 83, 84, 85, 86, 87 and 88 includes first case elements 83 and 84 defining both front and rear walls, second case element 85 and 86 defining top and bottom walls, and a third case element 87 and 88 defining lateral walls. These case elements are securely fixed to one another by means of respective fastening members 86a and 88a. In this embodiment, the case is constructed of a total of six plates to facilitate the mounting of other constituent elements into the case. However, the case is merely an example of the present invention and may be formed integrally or in other geometrical figure shapes besides a rectangular parallelepiped. That is, the case may be modified in various shapes.

One end of the rotary linkage 52 is disposed at the outside of the case 83, 84, 85, 86, 87 and 88 and the other end thereof is rotatably mounted at the inside of the case. The rotary linkage 52 includes a pair of linkage bars arranged in parallel with each other, a linkage bar-connecting section for interconnecting one ends of the pair of linkage bars, and a pin 35a for interconnecting the other ends of the pair of linkage bars. The pin 35a is rotatably mounted to the case through a pin through-hole formed at any one of the third case elements 87 and 88. As shown in FIG. 1, the pair of linkage bars of the rotary linkage are disposed outside the third case element 88 and the force transfer shaft 51 and the pin 35a pass through the third case element 87. This configuration is merely an example for an embodiment of the present invention, but is not limited thereto. That is, the linkage bars of the rotary linkage may be exposed externally through a through-hole formed on the first case element 83, thus making it possible to be variously modified.

The force transfer shaft 51 is mounted to one side of the rotary linkage 52 in such a fashion as to be oriented perpendicular to the rotating plane of the rotary linkage 52, more specifically in a direction perpendicular to a longitudinal direction of the rotary linkage. That is, the force transfer shaft 51 is disposed between the pin 35a and the linkage bar-connecting section while being interposed between the pair of linkage bars to be oriented orthogonally to the two linkage bars. The force transfer shaft 51 is not needed to be limited a specific shape, but as described below is preferable formed in a cylindrical shape so as to smoothly achieve the transfer of an external force through the surface contact between the force transfer shaft and the rotary linkage.

The crank linkage 35 is rotatably mounted at one end thereof to the inner side of the case 83, 84, 85, 86, 87 and 88. As described above, in case of rotatably mounting the rotary linkage 52 to the case by means of the pin 35a, the crank linkage 35 is also mounted at one end thereof to the case 83, 84, 85, 86, 87 and 88 along with the rotary linkage 52 by means of the pin 35a, such that the rotation center of the crank linkage 35 and the rotation center of the rotary linkage 52 may be positioned concentrically with respect to each other. In addition, if an external force having a value larger than a predetermined threshold value is exerted to the rotary linkage 52, the crank linkage 35 abutting against the force transfer shaft 51 at the outer circumferential edge thereof rotates about a point where the rotary linkage 52 and the crank linkage 35 are interconnected by means of the pin 35a in a direction in which the external force is exerted to the rotary linkage 52 along with the rotary linkage 52.

In the meantime, a force transfer shaft-accommodating portion is further provided at a region of the outer circumferential edge of the crank linkage 35 abutting against the force transfer shaft 51. The engagement between the force transfer shaft-accommodating portion and the force transfer shaft can secure a smooth contact area of the force transfer shaft 51 and the crank linkage 35, thereby ensuring the smooth contact between the force transfer shaft 51 and the crank linkage 35.

The connection link 32 is disposed at the inside of the case 83, 84, 85, 86, 87 and 88 in such a fashion as to be rotatably connected at one end thereof to the other end of the crank linkage 35. That is, the connection link 32 is rotatably connected at one end thereof to the other end of the crank linkage 35 by means of a pin 32b, and is connected at the other end thereof to a slider 28 of the support member by means of a pin 32a. Thus, when the crank linkage 35 rotates about the pin 35a, the connection link 32 rotates in the same direction as the rotation direction of the crank linkage 35 so as to transfer a force to the slider 28 of the support member.

The support means is rotatably connected to the other end of the crank linkage 35, and allows for the rotation of the crank linkage 35 when an external force having a value larger than a predetermined threshold value is exerted to the rotary linkage 52. In this embodiment, the support means includes the connection link 32, a slider 28, a slider guide shaft 34 and an elastic member 36. The slider guide shaft 34 is disposed in the form of a rod having a certain diameter inside the case. More specifically, the slider guide shaft 34 is supported at one end thereof by a first fixing block 24 and is supported at the other end thereof by a second fixing block 26. In this case, the first fixing block 24 and the second fixing block 26 are mounted to the inner walls of the first case elements 83 and 84 such that they are opposed to each other between the first case elements 83 and 84 of the case 83, 84, 85, 86, 87 and 88 while abutting against the second case elements 85 and 86 and the third case elements 87 and 88. In this case, the slider guide shaft 34 is formed of a rod whose cross-section is circular, but is not limited thereto and may be formed in a quadrangular shape in cross-section. Also, the slider guide shaft 34 may be formed in an I-shape in cross-section so as to have a structure in which it more stably guides the slider. In this embodiment, pair of slider guide shafts 34 of the support means are arranged symmetrically opposite to each other with respect to the rotary linkage 52.

The slider 28 is guided and slidably moved along the slider guide shaft 34. That is, the slider guide shaft 34 supportably mounted to the inner walls of the case by means of the first block 24 and the second 26 with it horizontally penetrating through the slider 28. At this time, the slider 28 is rotatably connected at one side thereof to the other end of the connection link 32.

The elastic member 36 is fit around the slider guide shaft 34 in such a fashion as to be disposed between the first fixing block 24 and the slider 28 to resiliently support the slider 28 while pushing the slider toward the fixing second block 26. In this case, the elastic member 36 is constructed in the form of a coil spring in a single number, but is not limited thereto. The elastic member 36 can be variously selected in shape, number and arrangement position within a range of transferring a force capable of preventing the rotation of the connection link 32 to the slider 28 so that the crank linkage 35 rotatably connected to the connection link 32 can bear the force transfer shaft 51 when an external force having a value smaller than a predetermined threshold value is exerted to the rotary linkage 51.

In the meantime, a normal line of the slider guide shaft 34 and a longitudinal line segment of the connection link 32 intersect each other. That is, when an external force having a value smaller than a predetermined threshold value is exerted to the rotary linkage 51, the slider 28 abuts against the second fixing block 26 while being forcibly pushed by the elastic member 36. At this time, the longitudinal line segment of the connection link 32 rotatably connected to one side of the slider 28 is not arranged in parallel with, but is arranged to intersect the normal line of the slider guide shaft 34 at a certain angle θ. Here, the angle θ may vary depending on a change in position of the second fixing block 26.

In FIG. 3, when a force is exerted to the crank linkage 35 in the direction of an arrow P by means of the force transfer shaft 51 through the rotary linkage 52, the crank linkage 35 is supported by the slider 28 mounted around the slider guide shaft 34 via the connection link 32 if the angle is θ so that the crank linkage 35 and the connection link 32 cannot rotate, thus not causing the slider 28 to be slidably moved in a rectilinear direction along the slider guide shaft 34. On the contrary, if the angle θ is greater than 0 degree, since a couple force is generated from both ends of the connection link 32 to cause the connection link 32 to produce a moment, a moving force is exerted to the slider 28 to allow the slider 28 to be slidably moved toward the first fixing block 24. In this case, as the angle θ increases, the slider 28 is more smoothly slidably moved toward the first fixing block 24 so that the elastic member can absorb the impact force transferred to the crank linkage 35 through the rotary linkage 52.

Now, the operational mechanism of the safety unit according to one embodiment of the present invention will be described hereinafter with reference to FIGS. 4 and 5. FIGS. 4 and 5 are schematic cross-sectional views showing the operational mechanism of the safety unit shown in FIG. 1.

Under a normal state where an external force perpendicular to the length of the rotary linkage 52 is not exerted to the rotary linkage, or when the external force (F) exerted to the rotary linkage has a value smaller than a predetermined threshold value, the rotary linkage 52 is maintained at a state of being stably supported by the support means and the crank linkage 35. Thereafter, as shown in FIG. 4, when the external force F transferred to the crank linkage 35 through one end of the rotary linkage has a value larger than the predetermined threshold value, the rotary linkage 52 mounted to the case 83 to 88 via the pin 35a rotates about the pin 35a in the direction of an arrow M. At this time, the external force F means an impact force exerted to the safety unit 1 according to the present invention. When the rotary linkage 52 rotates about the pin 35a in the direction of an arrow M, the crank linkage 35 rotatably mounted concentrically with the rotary linkage 52 via the pin 35a and abutting against the force transfer shaft 51 arranged perpendicularly to the rotating plane of the rotary linkage 52 also rotates in the same direction as the rotating direction of the rotary linkage, i.e., in a counterclockwise direction, so that the connection link 32 connected to the other end of the crank linkage 35 rotates about the pin 32b in the direction of an arrow n. Thus, as the connection link 32 rotates, the slider 28 connected at one side thereof to the other end of the connection link 32 via the pin 32a is slidably moved along the slider guide shaft 34 toward the first fixing block 24.

That is, when the external force exerted to the rotary linkage 52 and transferred to the slider 28 through the connection link 32 has a value smaller than the predetermined threshold value, the slider 28 does not overcome the elastic stopping power of the elastic member 36 so that it cannot be slidably moved along the slider guide shaft 34. As a result, the connection link connected to the slider and the crank linkage connected to the connection link are not allowed to rotate, and the rotary linkage is maintained at a normal state through the force transfer shaft abutting against the crank linkage.

On the other hand, when the external force exerted to the rotary linkage 52 has a value large than the predetermined threshold value, the movement force transferred to the slider 28 overcomes the elastic stopping power of the elastic member 36 so that the slider 28 is slidably moved along the slider guide shaft 34 toward the first fixing block 24, i.e., in the direction of an arrow Z so as to allow the crank linkage 35 connected to the connection link 32 to rotate about the pin 35a. FIG. 5 shows a state where the connection link 32 completely rotates.

When the external force F exerted to the force transfer shaft 52 is removed, the rotary linkage 52 starts to be lifted at one end thereof so that the slider 28 returns to its original position toward the second fixing block 26 by means of the elastic restoring force of the elastic member 36 compressed through the slidable movement of the slider 28 in the Z direction, simultaneously and the connection link 32 connected to the slider 28 rotates in an opposite direction to the arrow n direction and the crank linkage 35 and the rotary linkage 52 return to their original positions. Accordingly, in this embodiment, the safety unit 1 has a non-linear characteristic in that there is no variation in position of the above constituent elements with respect to an external force having a force smaller than a predetermined threshold value whereas there occurs a variation in position of the above constituent elements with respect to an external force having a force larger than the predetermined threshold value. Also, the safety unit 1 has a mechanism in which an external impact force exerted to the rotary linkage 52 is transferred to the elastic member 36 through a number of force transfer paths to cause the spring of the elastic member to attenuate or absorb the external impact.

Meanwhile, in another modified embodiment of the safety unit according to one embodiment of the present invention, the safety unit may further include an elastic force-adjusting means for adjusting the elastic force of the elastic member. That is, as shown in FIG. 6, a slider guide shaft 54 corresponding to the slider guide shaft 34 of the above embodiment is supported by the first fixing block 24 and the second fixing block 26. The elastic force-adjusting means includes a screw portion 54a and an adjustment nut 56. The screw portion 54a is formed on the outer circumferential surface of the slider guide shaft 54 in close proximity of the first fixing block 24, and the adjustment nut 56 is screw-engagedly disposed around the screw portion 54a. In this case, the screw portion 54a and the adjustment nut 56 are respectively formed with threads which are meshed with each other. The adjustment nut 56 supports the elastic member while abutting against the elastic member at one side thereof. The adjustment nut 56 can be moved axially along the slider guide shaft 54 while rotating axially about its horizontal axis so as to adjust the elastic force of the elastic member 36.

FIGS. 7 and 8 show another modified example of the safety unit according to the first embodiment of the present invention. Referring to FIGS. 7 and 8, there is shown a structure of the rotary linkage that can adjust an initial angle between the crank linkage and the connection link. In the proximity of one end of a rotary linkage 53 mounted to the case via a pin 35a is formed a linkage screw portion 53 which is disposed perpendicularly to the longitudinal direction of the rotary linkage 53, i.e., the plane defined by the force transfer shaft and the rotary linkage 53. The force transfer shaft is formed of a pair of opposed half shafts 61 and 62 which are can be separated from each other. The pair of opposed half shafts 61 and 62 are mounted at both ends thereof with a nut so that they can be vertically moved through screw-engagement of the nut with the linkage screw portion along the outer circumference of the linkage screw portion 63 in the longitudinal direction of the linkage screw portion 63. The linkage screw portion 63 rotates through the turning of a head 64 which can be respectively formed in a cross shape at the upper and lower ends thereof so as to adjust a distance between the opposed half shafts 62 and 63 of the separable-type force transfer shaft. In this case, the linkage screw portion 63 has different threads longitudinally formed at the upper and lower portions thereof with respect to a center thereof so that it is possible to perform the relative movement between the opposed half shafts 62 and 63 of the force transfer shaft supportably connected by means of the nut upon the rotation of the linkage screw portion 63. That is, the separable-type force transfer shaft can be constructed such that the opposed half shafts thereof are vertically moved far away from or close to each other by means of the rotation of the linkage screw portion 63.

That is, as shown in FIGS. 9 and 10, when the head 64 of the linkage screw portion rotates in the direction of an arrow m, the opposed half shafts 61 and 62 are vertically moved in opposite directions R to each other. In this manner, when the opposed half shafts are upwardly and downwardly moved far away from each other, the angle between the two crank linkages 35 mounted to the case through the pin 35a increase gradually, and simultaneously the orientational position of the connection link 32 connected to the crank linkage 35 is changed. Thus, it is possible to preset a force needed for an initial operation of the safety unit according to the present invention such that as the distance between the two opposed half shafts 61 and 62 increase, the angle θ between the longitudinal line segment of the connection link 32 and the normal line of the slider guide shaft 34 (see FIG. 8) also increases. In this embodiment, there has been shown the separable-type force transfer shaft having a pair of opposed half shafts which are vertically movable with respect to the rotary linkage 52, but the present invention is not limited thereto. That is, in case where the crank linkage and the support means are respectively provided in a single number as described above, the force transfer shaft movable vertically may also be provided in a single number.

FIGS. 11 and 12 are a schematic exploded perspective view and a front elevation view illustrating a safety unit according to a second embodiment of the present invention. Referring to FIG. 11, a safety unit 2 includes a case 87 to 89, a rotary linkage 52, a force transfer shaft 51, a crank linkage 35, and a support means. The support means of the safety unit 2 according to the second embodiment of the present invention is constructed in pair numbers, and includes a connection link 32, a slider guide shaft 34, a slider 28 and an elastic member. The crank linkage 35 and the support means is constructed such that they are opposed to each other with respect to the rotary linkage 52. The same elements as those in the above first embodiment are denoted by the same reference numerals for the sake of clarity and conciseness of explanation, and their redundant explanation will be omitted.

The case includes a first case element 87 and a second case element 88 defining lateral walls and a third case wall 89 defining a circumferential wall. The case is formed in a cylindrical shape. The safety unit 2 according to the present invention can be compactly formed through the cylindrical case, which is merely an example, and the case is not limited thereto.

The rotary linkage 52 is mounted to the first and second case elements 87 and 88 by means of a pin 52a, and the crank linkage 35 is rotatably mounted at one end thereof to the first and second case elements 87 and 88 by means of a pin 35a. Dissimilarly to the first embodiment, the rotary linkage 52 and the crank linkage 35 are different in central rotary axis from each other.

The rotary linkage 52 is mounted with the force transfer shaft 51 at one side thereof. The force transfer shaft 51 is supported by a pair of crank linkages 35 which are arranged to form an angle therebetween.

The crank linkage 35 is rotatably connected at the other end thereof to one end of the connection link 32 of which the other end is rotatably mounted to one side of the slider 28.

The slider 28 is disposed to be slidably moved along the slider guide shaft 34 supported by a first fixing block 24 and a second fixing block 26 arranged to confront the inner walls of the first to third case elements 87 to 89. The elastic member 36 is fit around the slider guide shaft 34 in such a fashion as to be disposed between the first fixing block 24 and the slider 28. This second embodiment is different from the above first embodiment in that the pair of slider guide shafts 34 are not arranged in parallel with each other, but are arranged such that their longitudinal line segments intersect each other when viewed from the rotating plane of the rotary linkage. However, the intersection between the longitudinal line segments of the pair of slider guide shaft 34 is not limited thereto.

FIGS. 13 and 14 show the operational mechanism of the safety unit according to the second embodiment of the present invention shown in FIG. 11. Under a normal state where any external force is not exerted to the rotary linkage 52 or when the external force (F) exerted to the rotary linkage has a value smaller than a predetermined threshold value, the force transfer shaft 51 to mounted the rotary linkage 52 does not transmit any force to the crank linkage 35, and hence the slider 28 elastically supported by the elastic member 36, the connection link 32 connected to the slider 28, and the crank linkage 35 connected to the connection link 32 are not changed in their positions.

On the contrary, when the external force F having a value larger than the predetermined threshold value is transferred to the rotary linkage 52, the rotary linkage 52 rotates about a pin 52a in the direction of an arrow M. When the rotary linkage 52 rotates about the pin 52a in a counterclockwise direction, the force transfer shaft 51 mounted perpendicularly to one side of the rotary linkage 52 transfers the external force to the crank linkage 35 and the connection link 32 while abutting against the crank linkage 35. The connection link 32 rotatably connected to the crank linkage 35 via the pin 32b rotates about the pin 32b in the direction of an arrow n. The external force transferred to the slider 28 rotatably connected to the connection link 28 via a pin 32a overcomes the elastic stopping power of the elastic member 36 to cause the slider 28 to slidably be moved along the slider guide shaft 34 in the direction of an arrow Z. Thus, the slidable movement of the slider 28 toward the first fixing block 24 allows for the rotation of the connection link 32 connected to the slider 28, and the crank linkage 32 connected to the connection link 28 so as to cause the rotary linkage 52 to rotate about the pin 52a in the counterclockwise direction. Accordingly, the external force exerted to the rotary linkage is absorbed or attenuate so that when an external force (a repulsive force by an external impact) is exerted to the safety unit, an external impact force against the safety unit or an object applying the external force to the safety unit can be relieved.

FIG. 14 shows a state where the connection link 32 completely rotates. It can be seen from FIG. 15 that the elastic member 36 is completely compressed. As the rotary linkage 52 is downwardly moved at a free distal end thereof, the slider 28 is slidably moved along the slider guide shaft 34 in the direction of an arrow Z to compress the elastic member 36 so that the external impact force exerted in the direction of an arrow F is attenuated by means of the elastic member 36. When the external force exerted to the rotary linkage in the direction of the arrow F is removed, the slider 28 is slidably moved along the slider guide shaft 34 toward the second fixing block 26 by means of the elastic restoring force of the elastic member 36. During the slidable movement of the slider 28, the connection link 32 rotates about the pin 32a in a clockwise direction so as to return to its original position as shown in FIG. 12.

FIGS. 15 and 16 are a schematic exploded perspective view and a front elevation view illustrating a safety unit according to a third embodiment of the present invention. The same elements as those in the above first and second embodiments are denoted by the same reference numerals for the sake of clarity and conciseness of explanation, and their redundant explanation will be omitted.

A case (89.91,92) includes a first case element 89 defining a circumferential wall, a second case element 91 and a third case element 92 defining lateral walls. The case is formed in a cylindrical shape which can be assembled through a fastening means 89a such as a bolt. A rotary linkage 52 is rotatably mounted to the second and third case elements 91 and 92 through a pin 52a, and a force transfer shaft 51 is mounted to one side of the rotary linkage 52 in such fashion as to be oriented perpendicular to the longitudinal direction of the rotary linkage 52. The crank linkage 35 is rotatably connected to the second and third case elements 91 and 92 through the pin 35a, and the connection link 32 is rotatably connected to the crank linkage 35 through the pin 32b.

The support means according to the third embodiment of the present invention includes a connection link 32, a sliding roller 29, a sliding roller guide slot 91a, and an elastic member 37. The sliding roller 29 is rotatably connected to the other end of the connection link 32 by means of the pin 32a. The sliding roller guide slot 91a is formed in the case so as to slidably guide the sliding roller 29.

The elastic member 37 is supported at one end thereof by the inner side of the case and abutted against the sliding roller at the other end thereof to pressurize the sliding roller with a torsional elastic force thereof. The elastic member 37 is a torsion spring. The elastic member is fixedly supported at one end thereof by a spring fixing shaft 39 and elastically supports at the other end thereof the sliding roller 29 so that when an external force exerted to the rotary linkage 52 has a value smaller than a predetermined threshold value, the sliding roller 29 is pushed to the left inside the sliding roller guide slot 91a. On the contrary, when the external force having a value larger than the predetermined threshold value is exerted to the rotary linkage 52 to cause the rotary linkage to rotate about the pin 52a in the counterclockwise direction, the angular displacement of the rotary linkage 52 is transmitted to the crank linkage 35 and the connection link connected to the crank linkage via the force transfer shaft 51. At this time, the sliding roller 29 rotatably connected to the other end of the connection link 32 is slidably guided along the sliding face of the sliding roller guide slot 91a formed respectively in the second and third case elements 91 and 92. In this case, the longitudinal line segment of the connection link 32 forms a certain angle θ with respect to the normal line of the sliding face of the sliding roller guide slot 91a.

FIGS. 17 and 18 show the operational state of the safety unit 3 according to the third embodiment of the present invention as shown in FIG. 15. In FIG. 17, when an external force F having a having a value larger than the predetermined threshold value is exerted to a free distal end of the rotary linkage 52, the rotary linkage 52 starts to descend in the direction an arrow M. Here, the external force means an impact force exerted to the safety unit 3. If the external force applied to the sliding roller of the support means through the crank linkage and the connection link, the rotary linkage 52 rotates about the pin 52a in the direction of an arrow M and the crank linkage 35 rotates about the pin 35a in the counter-clockwise direction. And simultaneously, the connection link 32 rotates about the pin 32b in the direction of an arrow n so as to push the sliding roller 29 in the right Z-direction inside the sliding roller guide slot. FIG. 18 shows a state where the connection link 32 completely rotates. It can be seen from FIG. 18 that the elastic member 37 is completely torsionally compressed. As the rotary linkage 52 is downwardly moved at a free distal end thereof, the sliding roller 29 is slidably moved inside the sliding roller guide slot 91a in the direction of an arrow Z to torsionally deform the elastic member 36 so that the external impact force exerted to the rotary linkage 52 in the direction of an arrow F is attenuated by means of the elastic member 37. When the external force F exerted to the rotary linkage is removed, the sliding roller 29 is slidably moved to the original position, that is, the leftmost wall of the sliding roller guide slot 91a by means of the elastic restoring force of the elastic member 37. During the slidable movement of the sliding roller 29, the connection link 32 rotates about the pin 32a in a clockwise direction so as to cause the crank linkage 35 and the rotary linkage 52 to rotate about the pins 32a and 52a, respectively, in the clockwise direction to return to their original positions as shown in FIG. 16.

Now, an embodiment of the safety unit according to first, second and third embodiments of the present invention will be described hereinafter. A safety device can be implemented which includes the safety unit according to the first, second and third embodiments of the present invention. That is, the safety device includes a first link, a second link, and a safety unit disposed between the first and second links. The safety unit includes a case fixedly mounted to one side of one of the first link and the second link, a rotary linkage fixedly mounted at one end thereof to one side of the other of the first link and the second link and rotatably mounted at the other end thereof to the case, a force transfer shaft mounted to one side of the rotary linkage in such a fashion as to be oriented perpendicular to the rotating plane of the rotary linkage, a crank linkage rotatably mounted at one end thereof to the inner side of the case and adapted to abut against the force transfer shaft at the outer circumferential edge thereof so as to be transferred with an external force to be rotatably moved, and a support means rotatably connected to the other end of the crank linkage and adapted to allow for the rotation of the crank linkage when an external force having a value larger than a predetermined threshold value is exerted to the rotary linkage through the first link or the second link.

FIGS. 19 to 24 illustrates various exemplary embodiments of a safety device including the safety unit according to the present invention.

In FIGS. 19 and 20, there is shown a robot arm used as the safety device including the safety unit. The robot arm includes an end effector (E), a wrist linkage (W), a joint section (J), and a shoulder linkage (S). The safety unit 1 to 3 is mounted at the joint section (J). The shoulder linkage S as the first link is mounted with the case of the safety unit 1 to 3, and the wrist linkage W as the second link is mounted with the rotary linkage of the safety unit 1 to 3. The power supplied from an actuator installed at the shoulder linkage S is applied to the wrist linkage W through the joint section J. When an external force having a value smaller than a predetermined threshold value is exerted to the end effector E or the wrist linkage W, the joint section J maintains its stiffness, but is not bent. On the other hand, as shown in FIG. 20, when an external force having a value larger than the predetermined threshold value is exerted to the end effector E or the like in the direction of an arrow due to an external impact during the operation of the robot arm, the safety unit 1 mounted at the joint section J is operated in the above-mentioned manner so that the joint section J connected to the wrist linkage W is not bent, thereby immediately attenuating the external impact. Thus, the impulse of the external force due to the collision against the robot arm is rapidly attenuated so as to prevent damage of the robot arm or collision object (person or object).

FIGS. 21 and 22 are schematic perspective views illustrating a revolving door R as other examples of the safety device including the safety unit according to the first, second and third embodiments of the present invention. The revolving door R has support plates S extending perpendicular to the bottom surface of a floor in the same plane of each main door part (revolving section) of the revolving door. Each of the support plates S is installed at the center of the revolving door and is attached with a handle for exerting a force of allowing the door to rotate. At respective top ends of the support plates S is provided a safety unit 1 to 3. The rotary linkage 52 of the safety unit 1 to 3 is fixed to an end portion of the support plate S and the case 87, and the case 87 of the safety unit is fixed to a revolving section D. The support plate S is kept at a state of being supported by the safety unit 1 to 3, and then the revolving door R rotates about its center shaft in the direction of an arrow.

In case where external force of the extent of pushing the support plate to rotate the revolving door R is exerted to the safety unit, there does not occur a bending in the safety unit 1 to 3, but the revolving section D and the support plate S rotate about the center shaft while maintaining their initial states. On the contrary, in case where a portion of the body of a person or an object is inserted between an entrance 0 and the support plate S, when a person or an object continues to exert an external impact having a value larger than a predetermined threshold value to the support plate S without being ignorant of it, the support plate is easily bent to one direction so that no damage is caused to the person or the object. Resultantly, as described above, the safety unit 1 to 3 is mounted to the revolving door R so as to be applied as a safety facility, the safety unit can provide a basic function of the revolving door R as well as absorb the external impact when an emergent accident happens so as to ensure safety.

FIGS. 23 and 24 are schematic perspective views illustrating other examples of the safety device including the safety unit according to the first, second and third embodiments of the present invention. An overhead rack for putting an object or load up thereon is installed over a passenger seat in the subway or the train. It is required to longitudinally mount a fall-preventing plate P to one side of the overhead rack S so as to prevent the object or load from falling down to the bottom. Between the overhead rack S and the fall-preventing plate P is mounted the safety unit 1 to 3. The rotary linkage 52 of the safety unit 1 to 3 is fixedly mounted to the fall-preventing plate P, and the case 87 of the safety unit is fixedly mounted to one side of the overhead rack S securely fixed to the inner wall of the subway or the train. When an external force is not exerted to the fall-preventing plate P, the structural shape as shown in FIG. 23 is kept so as to prevent the object from falling down to the bottom. Or example, although the object put on the overhead rack collides against the fall-preventing plate P due to the jolting of the subway or the train, an external force having a value smaller than a predetermined threshold value acts on the safety unit, thereby maintaining the structural shape as shown in FIG. 23.

In the meantime, as shown in FIG. 24, a passenger pulls down the fall-preventing plate P with a force having a value of more than the predetermined threshold value so as to bring down the luggage or load on the overhead rack, the safety unit 1 to 3 is operated to cause the fall-preventing plate P to rotate about an hinge shaft in the direction of an arrow. At this time, although the rotating angle of the fall-preventing plate P increases, a passenger exerts only a certain force to the fall-preventing plate P in terms of the structural characteristic of the safety unit so as to continue to easily pull the fall-preventing plate P down. If a general spring is used for the above purpose, the fall-preventing plate P rotates in proportional to an external force acting thereon. Thus, when the luggage or load on the overhead rack collides against the fall-preventing plate P due to the jolting of the subway or the train, the fall-preventing plate is likely to rotate. At this time, when a passenger pulls the fall-preventing plate P to bring down the luggage or load, he or she suffers from an inconvenience of having to exert a larger power to the fall-preventing plate P in proportional to the rotating angle. In case of the conventional overhead rack, since the fall-preventing plate P is not bent, a passenger had a difficulty in putting up or bringing down a luggage or load on the overhead rack. However, if the conventional overhead rack includes the inventive safety unit 1 to 3 mounted therein, a passenger can utilize the overhead rack more conveniently.

A safety unit according to a fourth embodiment of the present invention will now be described hereinafter. The safety unit of the above embodiments has a structure in which the rotary linkage is rotatably mounted to the case, but in the following embodiments is described a safety unit having a detachable structure. FIG. 25 is a schematic exploded perspective view illustrating a safety unit 10 according to a fourth embodiment of the present invention, FIG. 26 is a view showing a support means of the safety unit shown in FIG. 25, wherein one side of a case is removed, and FIG. 27 is a schematic cross-sectional view illustrating the safety unit shown in FIG. 25. The same elements as those in the above first embodiment are denoted by the same reference numerals for the sake of clarity and conciseness of explanation, and their redundant explanation will be omitted.

In FIG. 25, the safety unit 10 includes a fixing plate 74, a guide section 14, a movable plate 76, a division shaft 46 and 48, an adaptor 50, an wire 18 and a support means. The support means is disposed between the fixing plate 74 and the movable plate 76 which are spaced apart from each other. When an external force having a value larger than a predetermined threshold value is exerted to the movable plate through the wire, the relative movement of the movable plate with respect to the fixing plate is permitted.

The fixing plate 74 is fixedly mounted to a case 80. The fixing plate 74 is securely fixed to an opened one side of the case 80 formed with female screw holes 80a to be screw-engaged with a bolt 80b. In this case, the case 80 is formed in a hexahedral shape opened at one side thereof and having a hollow internal space, but is not limited thereto. In addition, the case 80 may be fixedly mounted to a lower end of the steering wheel or a ground surface mounted with a road traffic safety structure as an example of the safety unit which will be described below. The case may be constructed in a frame type as a mass body within a range in which the fixing plate 74 is fixed in position, and may be modified variously.

The guide section 14 (shown partially in FIG. 26) is fixedly mounted at one end thereof to one surface of the fixing plate 74, and disposed inside the case 80 in such a fashion as to be extend at the other end thereof toward the inside of the case. Here, the guide section 14 is formed of a quadruple-annular bar structure consisting of four annular bars, but the shape and number of the guide section is not limited thereto.

The movable plate 76 is disposed spaced apart from the fixing plate 74 and is mounted with a bushing 22 having a through-hole formed therein. The movable plate 76 is slidably guided along the guide section 14 penetrating through the through-hole of the bushing and is relatively moved with respect to the fixing plate 74.

The division shaft 46 and 48 is mounted to the other surface of the fixing plate 74 to be opposite to the case 80. The division shaft 46 and 48 is formed of plural opposed shaft members. First and second opposed shaft members 46 and 48 are detachably coupled to each other and have a structure capable of transmitting the power at a state where they are in close contact with each other. In this embodiment, the division shaft is provided in pair numbers. One of the two opposed shaft members has a protrusion 46a formed on one side surface thereof and the other of the two opposed shaft members has a recess 48a formed on one side surface thereof for accommodating the protrusion 46a therein. In this case, the protrusion 46a and the recess 48a confront each other. The protrusion 46a and the recess 48a may have a structure in which they are arranged in a pair at the centers of the confronting side surfaces of the two opposed shaft members and are arranged in plural pairs at peripheries of the confronting side surfaces of the two opposed shaft members in sizes smaller than those of the protrusion and the recess arranged at the centers of the confronting side surfaces. In this case, the protrusion 46a and the recess 48a may have a structure which is formed of a separate magnet so as to rigidly support the coupling between the two opposed shaft members and may be modified variously. The engagement structure of the protrusion 46a and the recess 48a ensures the transmission of power between the two opposed shaft members abutting against each other upon the axial rotation of the division shaft.

The adaptor 50 is mounted to the other end of the division shaft. The adaptor 50 serves to connect the division shaft with external constituent elements. Here, the adaptor is shown as a separate structure, but may have a structure in which one end of the wire is connected to the adaptor and which is formed integrally with one of the two opposed shaft members within a range of being disposed at the outer side surface of the division shaft. Various modification of the adaptor is possible.

The wire 18 is connected at one end thereof to the adaptor and at the end thereof to the movable plate 76. The wire 18 extends penetrating through the inside of the division shaft 46 and 48 and the fixing plate 74. That is, the two opposed shaft members 46 and 48 are respectively formed with wire through-holes 46c and 48c for passing the wire 18 therethrough. A wire holder 78 can be mounted to one surface of the movable plate 76, and a wire reel 16 can be mounted to one side of the adaptor 50. The wire reel 16 is connected to a tension-adjusting means 38 such as a tension-adjusting grip so that it rotates when the tension-adjusting means 38 is tightened or released so as to adjust the tension of the wire 18 wound around the wire reel 16.

The support means includes a connection link 32, a slider 28, a slider guide shaft 34 and an elastic member 36. The connection link 32 is rotatably mounted at one end thereof to one surface of the fixing plate and is oriented at the other end thereof toward the movable plate. According to circumstances, to one surface of the fixing plate 74 oriented toward the movable plate 76 can be mounted a fixing bracket 30. In this case, the connection link 32 can be rotatably mounted at one end thereof to the fixing bracket 30. The fixing bracket 30 may be mounted to the fixing plate 74 as a separate element, and may have a structure which is formed integrally with the fixing plate 74 so as to extend outwardly from one surface of the fixing plate 74. Various modification of the fixing bracket 30 is possible. The slider guide shaft 34 is supported by a first fixing block 24 and a second fixing block 26 provided to the movable plate 76, i.e., one surface of the movable plate 76 oriented toward the fixing plate 74. The slider guide shaft 34 is arranged perpendicular to the movement direction of the movable plate 76. The slider 28 is movably mounted to the slider guide shaft 34. In this case, the slider 28 is rotatably connected at one side thereof to the other end of the connection link 32 so as to be guided and slidably moved along the slider guide shaft. Between the first fixing block 24 and the slider 28 is disposed an elastic member 36. The slider abuts against the slider 28 at one end thereof and is supported at the other end thereof by the first fixing block 24 so that the slider 28 is elastically supported by the elastic member 36 toward the second fixing block 26. Of course, in this case, a normal line of the slider guide shaft 34 and a longitudinal line segment of the connection link intersect each other so as to form a certain angle θ (see FIG. 27) therebetween.

FIGS. 28 and 29 are views showing the operational mechanism of the safety unit according to the fourth embodiment of the present invention as shown in FIG. 25. The operational mechanism of the safety unit will be described hereinafter with reference to FIGS. 28 and 29. In FIG. 27, under a standby state, when no external force is exerted to the adaptor 50, the slider 28 is not changed in position by means of the elastic stopping power of the elastic member 36, so that there do not occur the rotation of the connection link 32 connected to the slider 28 as well as a positional change in the movable plate 76 toward the fixing plate 74, thus not causing the two opposed shaft members to be separated from each other.

In addition, when an external force F having a value smaller than a predetermined threshold value is exerted to the adaptor 50, the wire 18 which has been kept at a state of being tightly tensed is pulled in the direction of an arrow S. At this time, the slider 28 supported by the elastic member 36 does not cause positional displacement.

Thereafter, when the external force F having a value larger than the predetermined threshold value is exerted to the adaptor 50, the slider 28 compresses the elastic member 36 and the connection link 32 rotatably connected to the slider 28 also rotates in response to the positional displacement of the slider 28. Thus, the movable plate 76 is relatively moved with respect to the fixing plate 74 along the guide section 14 in the direction of an arrow S in response to the rotation of the connection link 32. As a result, the first shaft member 46 and the second shaft member 48 of the division shaft are separated from each other. Of course, when the external force F is removed, the slider 28 returns to its original position by means of the elastic restoring force of the elastic member 36 so that the movable plate 76 also returns to its original position and the second shaft member 48 which is prevented from being separated from the first shaft member 46 by means of the wire 18 returns to its original position. The transmission of the external force and the positional returning mechanism of the elements are performed momentarily.

FIG. 30 is a cross-sectional view illustrating another modified example of a safety unit 10 according to the fourth embodiment of the present invention. Similarly to the screw portion 54a and the adjustment nut 56 in the above first embodiment, the screw portion 54a the adjustment nut 56 are provided on the outer circumferential surface of the slider guide shaft 54 in close proximity of the first fixing block 24. In this case, the screw portion 54a and the adjustment nut 56 are respectively formed with threads which are meshed with each other. The adjustment nut 56 can be axially moved along the slider guide shaft 54 along with the axial rotation of the adjustment nut 56. At this time, the adjustment nut 56 abuts against the elastic member 36 at one surface thereof so that an elastic force of the elastic member 36 which has been set initially is changed along with the axial movement of the adjustment nut 56, which is the same as the example in the above embodiment.

Further, FIG. 31 is a schematic partial cross-sectional view illustrating another modified example of a safety unit 10 according to the fourth embodiment of the present invention. The safety unit 10 may further include a slider position control section. The slider position control section includes a height-adjusting through-hole 26a penetratingly formed in the second fixing block 26 adjacent to the slider 28 in the longitudinal direction of slider guide shaft 34, and a height-adjusting member 82 supportably abutted at one end thereof against one end of the slider 28 while passing through the height-adjusting through-hole 26a for adjusting the height of the slider 28. The height-adjusting through-hole 26a and the height-adjusting member 82 are respectively formed with threads which are meshed with each other, and the height-adjusting member 82 is formed with a head 82a at one end thereof. The height-adjusting member 82 is turned using a rotation tool such as a hexagonal L-wrench so as to axially rotate the height-adjusting member 82. When the height-adjusting member 82 axially rotate, the top end portion of the height-adjusting member 82 abuts against the bottom end portion of the slider 28 and the position of the slider 28 on the slider guide shaft 34 is changed so that an angle θ between a normal line of the slider guide shaft 34 and a longitudinal line segment of the connection link 32 can be adjusted. Thus, the standby position of the slider 28 is adjusted appropriately through the height-adjusting member 82 so that a minimum threshold force capable of operating the safety unit 10 can be adjusted.

A safety unit 10 according to a fifth embodiment of the present invention will be described hereinafter. FIG. 32 is an exploded perspective view illustrating a safety unit according to a fifth embodiment of the present invention, FIG. 33 is a front view illustrating the safety unit shown in FIG. 32, FIG. 34 is a schematic view viewed from the direction of an arrow A in FIG. 33, and FIG. 35 is a schematic partial cross-sectional view illustrating the inner construction of the safety unit shown in FIG. 32. The same elements as those in the above first to fourth embodiments are denoted by the same reference numerals for the sake of clarity and conciseness of explanation, and their redundant explanation will be omitted.

In FIG. 32, the safety unit 10 includes a fixing plate 20, a guide section 14, a movable plate 12, a division shaft 46 and 48, an adaptor 50, a wire 18 and a support means. The support means is disposed between the fixing plate 20 and the movable plate 12 which are spaced apart from each other. When an external force having a value larger than a predetermined threshold value is exerted to the movable plate through the wire, the relative movement of the movable plate with respect to the fixing plate is permitted. In this embodiment, the support means includes a connection link 32, a slider 28, a slider guide shaft 34 and an elastic member 36.

The fixing plate 20 is fixedly mounted to a case so as to act a certain repulsive force with respect to an external force exerted to the adaptor to enable the slidable movement of the movable plate 12 which will described later, for example, such as being fixed to one side of a robot arm connected through a joint.

The guide section 14 (shown partially in FIG. 26) is fixedly mounted at one end thereof to one surface of the fixing plate 20. Here, the guide section 14 is formed of a quadruple-annular bar structure consisting of four annular bars, but the shape and number of the guide section is not limited thereto.

The movable plate 12 is disposed spaced apart from the fixing plate 20 and is mounted with a bushing 22 having a through-hole formed therein. The movable plate 12 is slidably guided along the guide section 14 penetrating through the through-hole of the bushing and is relatively moved with respect to the fixing plate 20.

The division shaft 46 and 48 is mounted to the other surface of the fixing plate 20. Since the detailed construction of the division shaft 46 and 48 is the same as that of the fourth embodiment, the description thereof will be omitted.

The adaptor 50 is mounted to the other end of the division shaft. The adaptor 50 serves to connect the division shaft with external constituent elements. Here, the adaptor is shown as a separate structure, but may have a structure in which one end of the wire is connected to the adaptor and which is formed integrally with one of the two opposed shaft members within a range of being disposed at the outer side surface of the division shaft. Various modification of the adaptor is possible.

The wire 18 is connected at one end thereof to the adaptor and at the end thereof to the movable plate 12. The wire 18 extends penetrating through the inside of the division shaft 46 and 48 and the fixing plate 12. That is, the two opposed shaft members 46 and 48 are respectively formed with wire through-holes 46c and 48c for passing the wire 18 therethrough. A wire holder or a wire reel can be mounted to one surface of the movable plate 12, and a wire reel 16 can be mounted to one side of the adaptor 50. The wire reel 16 is rotatably supported by one side surface of the adaptor 50. The wire reel 16 is connected to a tension-adjusting means 38 such as a tension-adjusting grip so that it rotates when the tension-adjusting means 38 is tightened or released so as to adjust the tension of the wire 18 wound around the wire reel 16. That is, as shown in FIG. 34, a worm gear 42 is rotatably mounted to a lower end portion of the movable plate 12 or the adaptor 50 and a worm 44 is gear-engaged with a lateral circumferential surface of the worm gear. The worm 44 is directly connected to the tension-adjusting means 38. Thus, when the worm 44 axially rotates through the manipulation of the tension-adjusting means 38, the worm gear 42 rotates in a corresponding direction to cause the wire reel to wind or release the wire 18.

The support means includes a connection link 32, a slider 28, a slider guide shaft 34 and an elastic member 36. The connection link 32 is rotatably mounted at one end thereof to one surface of the movable plate 12 and is oriented at the other end thereof toward the fixing plate. According to circumstances, to one surface of the movable plate 12 oriented toward the fixing plate 20 can be mounted a fixing bracket 30. In this case, the connection link 32 can be rotatably mounted at one end thereof to the fixing bracket 30. The fixing bracket 30 may be mounted to the movable plate 12 as a separate element, and may have a structure which is formed integrally with the movable plate 12 so as to extend outwardly from one surface of the movable plate 12, which is the same as in the above embodiments. The slider guide shaft 34 is supported by a first fixing block 24 and a second fixing block 26 provided to the fixing plate 20, i.e., one surface of the fixing plate 20 oriented toward the movable plate 12. The slider guide shaft 34 is arranged perpendicular to the movement direction of the movable plate 12. The slider 28 is movably mounted to the slider guide shaft 34. In this case, the slider 28 is rotatably connected at one side thereof to the other end of the connection link 32 so as to be guided and slidably moved along the slider guide shaft. Between the first fixing block 24 and the slider 28 is disposed an elastic member 36. The slider abuts against the slider 28 at one end thereof and is supported at the other end thereof by the first fixing block 24 so that the slider 28 is elastically supported by the elastic member 36 toward the second fixing block 26. Of course, in this case, a normal line of the slider guide shaft 34 and a longitudinal line segment of the connection link intersect each other so as to form a certain angle θ (see FIG. 35) therebetween.

FIGS. 36 and 37 are views showing the operational mechanism of the safety unit 10 according to the fifth embodiment of the present invention. The operational mechanism of the safety unit will be described hereinafter with reference to FIGS. 36 and 37. In FIG. 35, under a standby state, when no external force F is exerted to the adaptor 50, the slider 28 is not changed in position by means of the elastic stopping power of the elastic member 36, so that there do not occur the rotation of the connection link 32 connected to the slider 28 as well as a positional change in the movable plate 12 toward the fixing plate 20, thus not causing the two opposed shaft members to be separated from each other.

In addition, when an external force F having a value smaller than a predetermined threshold value is exerted to the adaptor 50, the wire 18 which has been kept at a state of being tightly tensed is pulled in the direction of an arrow S. At this time, the slider 28 supported by the elastic member 36 does not cause positional displacement.

Thereafter, when the external force F having a value larger than the predetermined threshold value is exerted to the adaptor 50, the slider 28 compresses the elastic member 36 and the connection link 32 rotatably connected to the slider 28 also rotates in response to the positional displacement of the slider 28. Thus, the movable plate 12 is relatively moved with respect to the fixing plate 20 along the guide section 14 in the direction of an arrow S in response to the rotation of the connection link 32. As a result, the first shaft member 46 and the second shaft member 48 of the division shaft are separated from each other. Of course, when the external force F is removed, the slider 28 returns to its original position by means of the elastic restoring force of the elastic member 36 so that the movable plate 12 also returns to its original position and the second shaft member 48 which is prevented from being separated from the first shaft member 46 by means of the wire 18 returns to its original position, which is the same as in the above embodiments.

FIG. 38 is a cross-sectional view illustrating another modified example of a safety unit 10 according to the fifth embodiment of the present invention. Similarly to the screw portion 54a and the adjustment nut 56 in the above first embodiment, the screw portion 54a the adjustment nut 56 are provided on the outer circumferential surface of the slider guide shaft 54 in close proximity of the first fixing block 24. An elastic force of the elastic member 36 which has been set initially is changed along with the axial movement of the adjustment nut 56, which is the same as the example in the above embodiment.

In addition, as shown in FIGS. 39 and 40, a lever 58 is mounted to the second fixing block 26 so that the standby position of the slider 28 can be adjusted.

As shown in the drawings, the second fixing block 26 is provided at both side ends thereof with a lever 58. The lever 58 can rotate about a support pin 60 as a rotating shaft upwardly or downwardly. Also, a front end of each lever 58 is positioned below the slider 28. Thus, as shown in FIG. 40, when a rear end of the lever 58 descends, the front end of the lever 58 ascends to lift up the slider 28. When the slider ascends, the offset angle (θ of FIG. 35) increases by the ascended distance, and hence a minimum threshold force capable of operating the safety unit 10 decreases.

Now, an example of the safety unit according to the fourth and fifth embodiments of the present invention will be described hereinafter. A safety device can be implemented which includes the safety unit according to the fourth and fifth embodiments of the present invention. That is, the safety device includes a first link, a second link, and a safety unit disposed between the first and second links. The safety unit includes a fixing plate fixedly mounted to one side of one of the first link and the second link, a guide section fixedly mounted at one end thereof to one surface of the fixing plate; a movable plate disposed spaced apart from the fixing plate in such a fashion as to be slidably guided by the guide section to be relatively moved with respect to the fixing plate; a division shaft mounted at one end thereof to the other surface of the fixing plate to be opposite to the case, the division shaft including a pair of opposed shaft members detachably coupled to each other for transmitting the power at a state where they are in close contact with each other; an adaptor mounted to the other end of the division shaft for connecting the division shaft with one side of the other of the first link and the second link; a wire connected at one end thereof to the adaptor and at the end thereof to the movable plate in such a fashion as to extend penetrating through the inside of the division shaft and the fixing plate; and a support means disposed between the fixing plate and the movable plate in such a fashion that the fixing plate and the movable plate are spaced apart from each other, the support means allowing for the relative movement of the movable plate with respect to the fixing plate when an external force having a value larger than a predetermined threshold value is exerted to the movable plate via the wire.

FIGS. 41 and 42 are views showing schematic perspective view illustrating examples of a safety device including the safety unit according to the fourth and fifth embodiments of the present invention.

In FIG. 41, the case 80 and the fixing plates 74 and 20 of the safety unit 10 can be mounted to a steering wheel column 70 as the first link and the adaptor 50 can be mounted to a steering wheel side S. As shown in FIG. 42, a driver and the steering wheel S collide with each other due to the sudden stopping or collision of an automotive vehicle so that when an external force having a value larger than a predetermined threshold value is exerted to the steering wheel S, the safety unit 10 mechanically responds immediately to this so as to cause the steering wheel S to be deviated from an axial line of the steering wheel column 70. As a result, the impulse due to the collision between the driver and the steering wheel S is attenuated to reduce or remove a damage to be caused to the driver.

In addition, a road traffic safety device is shown in FIGS. 43 and 44 as another example of a safety device including the safety unit 10 according to the fourth and fifth embodiments of the present invention. A road traffic safety device S installed with a luminous string for guiding the state of a traveling road is mounted to the ground surface through the safety unit 10. The road traffic safety device S is maintained at a state of being arranged vertically to the ground surface by means of the safety unit. When an external force having a value larger than a predetermined threshold value is exerted to the road traffic safety device in the direction of an arrow, the safety unit 10 allows the road traffic safety device to rotate through the above-mentioned bent process so as to protect the road traffic safety device or an object acting an impact force on the road traffic safety device. That is, when the predetermined threshold value is set to be low, the damage of the road traffic safety device S or a vehicle due to a slight collision can be prevented. Moreover, according to the circumstances, the predetermined threshold value is selected within an appropriate range so that when a vehicle, etc., collides against the road traffic safety device S, it is not deformed so as to prevent the impact force generated due to the collision from being transferred to the vehicle as it is.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. The safety unit according to the present invention provides a passive control-type safety device through a simple structure so that an excellent response and reliability are secured and simultaneously a manufacturing cost are reduced, thus accompanying an effect of improving productivity. Further, the safety unit according to the present invention can be easily and simply implemented through a simple structure to minimize an installation and working space, so that compact modularization of facilities including the safety unit is possible and the safety unit can be realized as a safety device for securing safety in a robot arm, a revolving door, a side view mirror for automobiles, a power steering system for automobiles, a bumper, road safety facilities, and various systems and facilities in which an impact or collision can occur through the compact modularization.

The invention claimed is:

1. A safety unit comprising:
   a case;
   a rotary linkage disposed at one end thereof at the outside of the case and rotatably mounted at the other end thereof to the case;
   a force transfer shaft mounted to one side of the rotary linkage in such a fashion as to be oriented perpendicular to the rotating plane of the rotary linkage;
   a crank linkage rotatably mounted at one end thereof to the inner side of the case and adapted to abut against the force transfer shaft at the outer circumferential edge thereof so as to be transferred with an external force to be rotatably moved; and
   a support means rotatably connected to the other end of the crank linkage and adapted to allow for the rotation of the crank linkage when an external force having a value larger than a predetermined threshold value is exerted to the rotary linkage.

2. The safety unit according to claim 1, wherein the support means comprises:
   a connection link rotatably connected at one end thereof to the other end of the crank linkage;
   a slider guide shaft disposed at the inner side of the case;
   a slider rotatably connected at one side thereof to the other end of the connection link so as to be guided and slidably moved along the slider guide shaft; and
   an elastic member supported at one end thereof by the slider and at the other end thereof by the inner wall of the case so as to impart an elastic force to the slider,
   wherein a normal line of the slider guide shaft and a longitudinal line segment of the connection link intersect each other.

3. The safety unit according to claim 2, wherein the crank linkage and the support means are respectively provided in pair numbers in such a fashion that their respective pairs are arranged symmetrical to each other with respect to the rotary linkage so as to support bi-directional rotation of the rotary linkage, and wherein the pair of slider guide shafts are arranged in parallel with each other.

4. The safety unit according to claim 3, wherein the crank linkage further comprises a force transfer shaft-accommodating portion formed at the outer circumferential edge thereof for accommodating the force transfer shaft.

5. The safety unit according to claim 3, wherein the force transfer shaft is movably arranged in the perpendicular direction to the longitudinal direction of the rotary linkage so as to adjust the angle between the longitudinal line segment of the connection link and the normal line of the slider guide shaft.

6. The safety unit according to claim 2, wherein the crank linkage and the support means are respectively provided in pair numbers in such a fashion that their respective pairs are arranged symmetrical to each other with respect to the rotary linkage so as to support bi-directional rotation of the rotary linkage, and wherein the longitudinal line segments of the pair of slider guide shafts intersect each other when viewed from the rotating plane of the rotary linkage.

7. The safety unit according to claim 2, wherein the slider guide shaft is disposed to pass through the elastic member and the support means further comprises an elastic force-adjusting means disposed at one end of the slider guide shaft in such a fashion as to be arranged between the elastic member and the case for adjusting the elastic force of the elastic member.

8. The safety unit according to claim 2, wherein the support means comprises:

a connection link rotatably connected at one end thereof to the other end of the crank linkage;

a sliding roller rotatably connected to the other end of the connection link;

a sliding roller guide slot formed in the case for slidably guiding the sliding roller therein; and an elastic member supported at one end thereof by the inner side of the case and abutted against the sliding roller at the other end thereof to pressurize the sliding roller with a torsional elastic force thereof, wherein a normal line of the sliding face of the sliding roller guide slot and a longitudinal line segment of the connection link intersect each other.

9. A safety device comprising a first link, a second link, and a safety unit disposed between the first and second links, wherein the safety unit includes:

a case fixedly mounted to one side of one of the first link and the second link, a rotary linkage fixedly mounted at one end thereof to one side of the other of the first link and the second link and rotatably mounted at the other end thereof to the case, a force transfer shaft mounted to one side of the rotary linkage in such a fashion as to be oriented perpendicular to the rotating plane of the rotary linkage;

a crank linkage rotatably mounted at one end thereof to the inner side of the case and adapted to abut against the force transfer shaft at the outer circumferential edge thereof so as to be transferred with an external force to be rotatably moved; and a support means rotatably connected to the other end of the crank linkage and adapted to allow for the rotation of the crank linkage when an external force having a value larger than a predetermined threshold value is exerted to the rotary linkage through the first link or the second link.

* * * * *